United States Patent [19]

Aoyama

[11] Patent Number: 5,737,642

[45] Date of Patent: Apr. 7, 1998

[54] CAMERA HAVING A LINE-OF-SIGHT DETECTING MEANS

[75] Inventor: Keisuke Aoyama, Yokohama, Japan

[73] Assignee: Canon Kabushiki Kaisha, Tokyo, Japan

[21] Appl. No.: 524,408

[22] Filed: Sep. 6, 1995

[30] Foreign Application Priority Data

| Sep. 7, 1994 | [JP] | Japan | 6-238609 |
| Aug. 21, 1995 | [JP] | Japan | 7-212022 |

[51] Int. Cl.$^6$ .................................................. G03B 17/00
[52] U.S. Cl. ........................................... 396/51; 396/104
[58] Field of Search ................................. 354/400, 402, 354/410, 62, 219, 173.1, 173.11, 266, 267.1, 268; 396/51, 104

[56] References Cited

U.S. PATENT DOCUMENTS

| 5,200,774 | 4/1993 | Nakajima | 354/219 |
| 5,392,091 | 2/1995 | Iwasaki. | |
| 5,467,161 | 11/1995 | Odaka | 354/410 |
| 5,497,210 | 3/1996 | Odaka | 354/410 |

FOREIGN PATENT DOCUMENTS

| 4317133 | 11/1993 | Germany. |
| 4061135 | 3/1986 | Japan. |

OTHER PUBLICATIONS

Patent Abstracts of Japan, vol. 018, No. 454, (P-1791), Aug. 24, 1994 (JP-06-148510, May 27, 1994).

Patent Abstracts of Japan, vol. 016, No. 571 (P-1459), Dec. 11, 1992 (JP-04-221943, Aug. 12, 1992).

*Primary Examiner*—Russell E. Adams
*Attorney, Agent, or Firm*—Fitzpatrick, Cella, Harper & Scinto

[57] ABSTRACT

A camera for detecting the line-of-sight of a user includes a photographing controller for performing a continuous shot operation in which a photographing operation is repeated continuously while a release button is pressed, a line-of-sight detector for detecting the position of the user's line-of-sight, a line-of-sight detection controller for operating the line-of-sight detector for every photographing operation, a focus detector for performing a focus detecting operation based on the position of the line-of-sight detected by the line-of-sight detector, a determinator for determining whether the result of focus detection by the focus detector is appropriate, and a focus detection controller for operating the focus detector without operating the line-of-sight detector if the determinator determines that the result of focus detection is inappropriate.

21 Claims, 18 Drawing Sheets

| FIG. 3A | FIG. 3B |

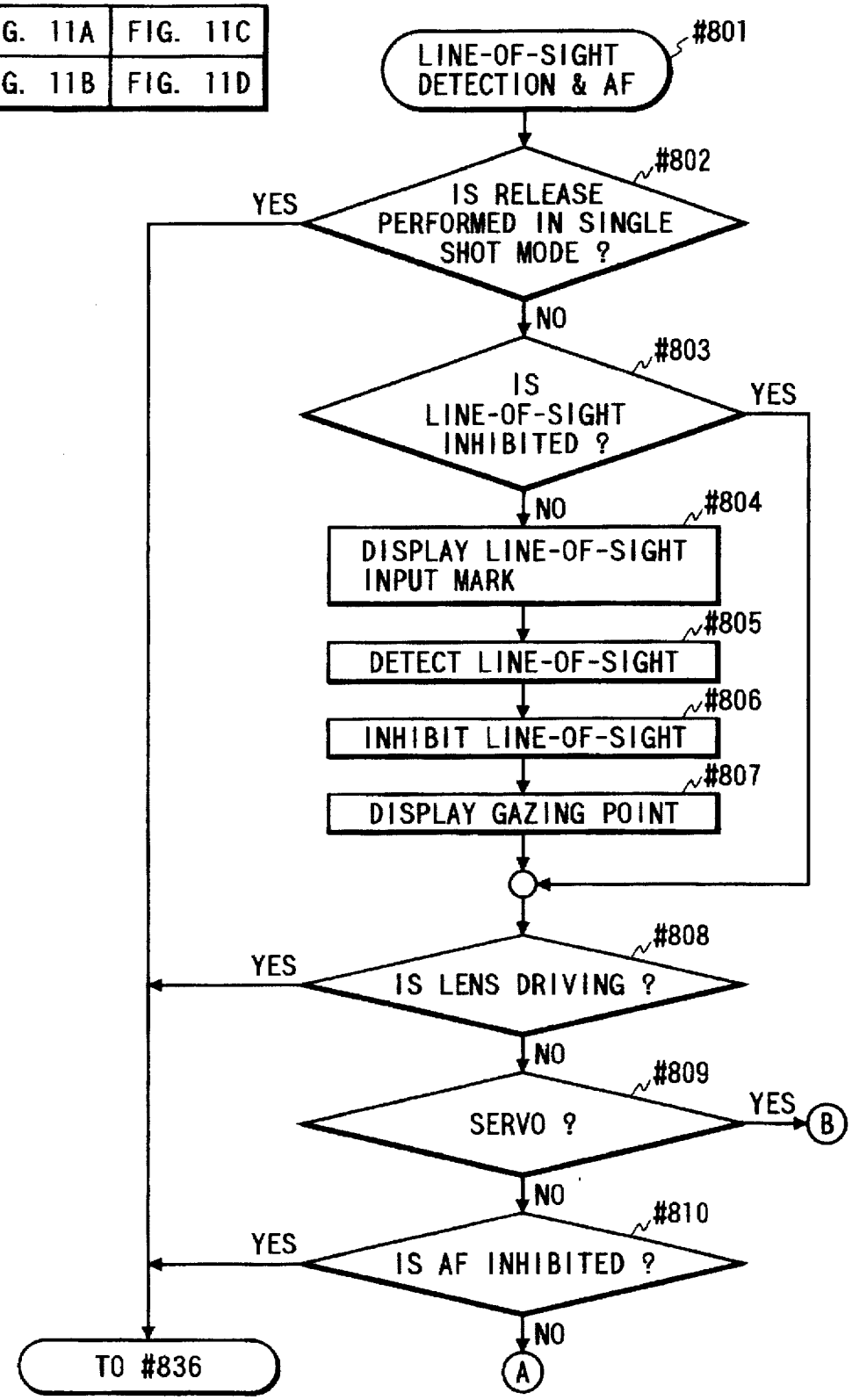

CAMERA HAVING A LINE-OF-SIGHT DETECTING MEANS

BACKGROUND OF THE INVENTION

1. Field of the Invention

The invention relates to an improved camera provided with a line-of-sight detecting function for driving a focusing optical system for a photographic lens according to a focus signal obtained in a focus detecting area selected by a line-of-sight detecting means.

2. Related Background Art

Hitherto, a variety of cameras have been developed for detecting the direction in which a photographer fixes his/her eyes with a so called line-of-sight detecting means provided at a part of a camera for detecting the above-described direction of a photographer's gaze and detecting the area (position) in a visual field of a finder on which the photographer fixes his/her eyes, as well as performing a variety of photographing functions, such as automatic focusing and automatic exposure controlled according to a signal from the line-of-sight detecting means.

For example, Japanese Patent Application Laid-open No. 61-61135, describes a camera for selecting the area in which a focal detector is operated according to an output from the line-of-sight detecting means in order to focus a photographic system.

Also, in U.S. patent application Ser. No. 08/331,154 by the applicant of the present application, describes a camera provided with a line-of-sight detecting means for detecting the direction on which a photographer fixes his/her eyes, a focus detecting means having plural focus detecting areas, and an automatic exposure controlling means having plural distributions of sensitivity for photometry, wherein driving of the focus detecting means and the automatic exposure controlling means is controlled according to a signal output from the line-of-sight detecting means.

The focusing mode provided with a camera hitherto has two types of modes, one for a static target object and one for a dynamic target object.

In the mode for a static target object, a photographic lens is operated until the lens is focused and once it is focused, no focus detecting operation is performed. In the meantime, in the mode for a dynamic target object in which a lens is operated according to the status of a focus, even after a photographic lens is focused, a focus detecting operation is repeated.

The operation for detecting a line of sight toward a camera provided with a line-of-sight detecting function and detecting the focus thereof will be described for every focusing mode below.

1) Mode for a Static Target Object (One-shot AF Mode)

When a release button is pressed half way, that is, with a first stroke, a line-of-sight detecting means is first operated for detection of the focus and the point on which a photographer fixes his/her eyes in a visual field of a finder is searched.

According to the procedure, a light source for detecting the operator's line of sight is lit, data is stored in an area sensor for detecting the line of sight and a signal representing an image of the photographer's eyeball is read. The direction of the photographer's line of sight is obtained from the above-described eyeball image signal. Next, the point in a visual field of the finder on which the photographer fixes his/her eyes is obtained from the direction of the photographer's line of sight. This point is represented by coordinates in a visual field of the finder.

A focus detection area corresponding to the coordinates in a visual field of the finder is determined based upon these parameters. The status of the focus in the focus detection area obtained through such a process is detected by a focus detecting means and a photographic lens is operated until it is focused based upon the information.

As described above, once a focus detection area is determined by the line-of-sight detecting means, focusing afterwards is performed with attention paid only to the status of the focus in the focus detection area.

2) Mode for a Dynamic Target Object (Servo AF Mode)

When a release button is pressed half way as in the above-described mode for a static target object, a line-of-sight detecting means is operated in order to determine a focus detection area. Afterwards, a lens is operated with attention paid only to the status of the focus in the focus detection area.

Apart from the above description, a line of sight may be necessarily detected every time, before detection of the focus and a lens may be operated after a focus detection area is decided, as shown in U.S. patent application Ser. No. 08/364,723 in order to link detection of the focus with the point on which a photographer fixes his/her eyes which moves corresponding to movement of a target object.

Next, a feed mode for feeding film comprises two types of modes, a one-shot feed mode and a continuous-shot feed mode. In an one-shot feed mode, when a release button is pressed, a frame of a film is exposed and fed and the next frame cannot be photographed until the release button is released and pressed again. In a continuous-shot feed mode, when a release button is pressed, first a frame is exposed and fed, and if the release button remains pressed when feeding film is finished, the next frame is exposed and fed so that plural frames can be photographed continuously.

When the above-described continuous-shot mode and the mode for a dynamic target object are combined, plural continuous frames in focus can be photographed while detection of a focus is performed.

Also, when the above-described continuous-shot mode and the mode for a static target object are combined, plural frames can be photographed in the first determined focus state of the camera.

However, in such a combination of the continuous-shot mode and the mode for a dynamic target object, a focus detection area is not changed according to a change of the point on which a photographer fixes his/her eyes which moves to correspond to movement of a target object during a continuous shot if a focus detection area is determined by a line-of-sight detecting means for focusing only when a release button is first pressed.

On the contrary, when the line of sight is necessarily detected every time, before detection of the focus and focusing is performed after the focus detection area is determined in order to link a focus detection area with the point on which a photographer fixes his/her eyes which moves to correspond to movement of a target object, each time for detecting focus is increased by the time for detecting the line of sight and a lens cannot be operated according to movement of the target object so that a picture in focus cannot be photographed.

SUMMARY OF THE INVENTION

One aspect of the invention is to provide a camera in which a line-of-sight detecting operation is performed every photographing action during continuous photography and a focus detection area is selected based upon the result, provided with a determination means for determining whether a focus detection result is appropriate or not, wherein only a focus detection operation is performed again without performing a line-of-sight detecting operation if the determination means determines a focus detection result to be inappropriate.

Therefore, one aspect of the invention is to provide a camera wherein a focus detection according to the intent of a photographer is enabled and the photographing speed in continuous photography can be kept without being reduced.

DESCRIPTION OF THE PREFERRED EMBODIMENTS

First Embodiment

The details of the invention will be described below based upon embodiments shown in figures.

Figure 1:
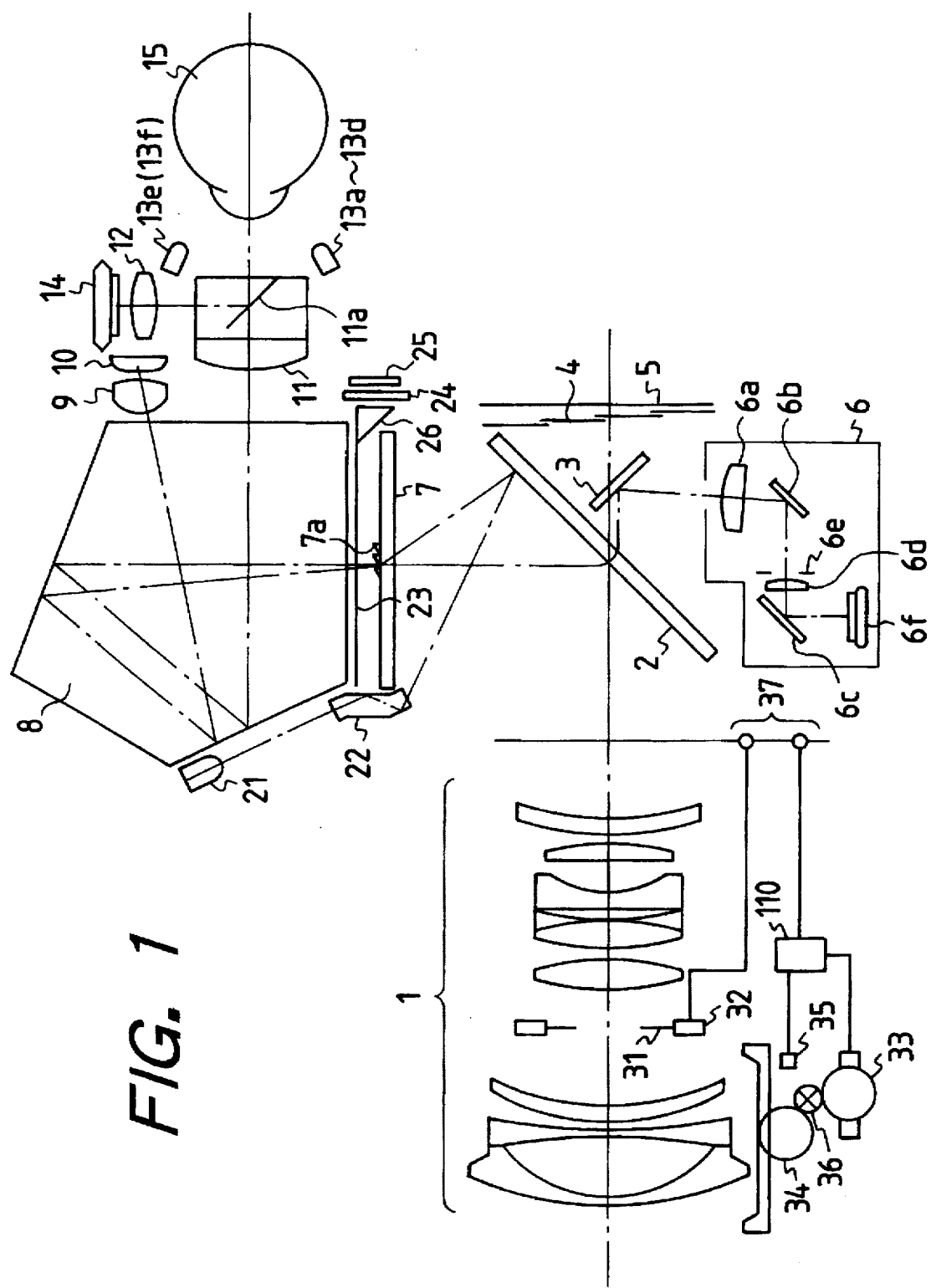
FIG. 1 is an arrangement plan of an optical system according to a first embodiment in case the invention is applied to a single-lens reflex camera.
Figure 2:
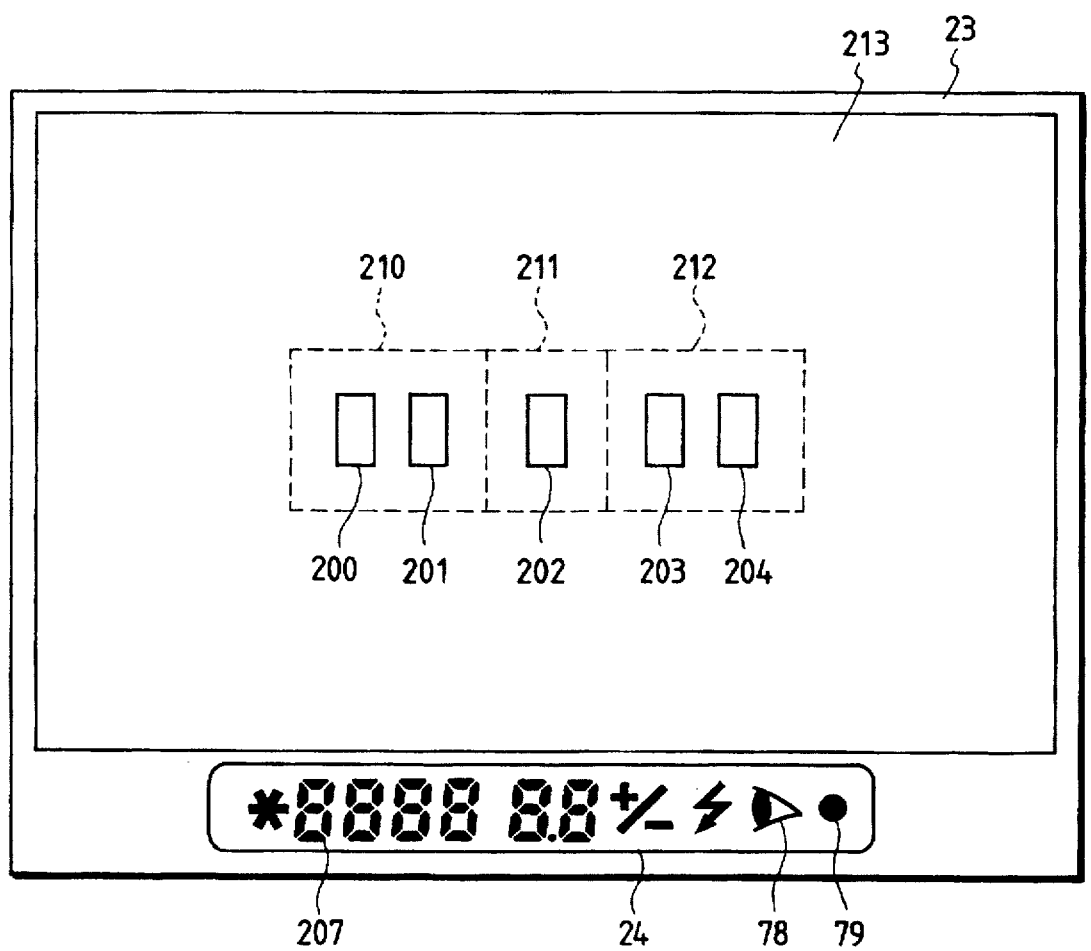
FIG. 2 shows the inside of a finder in the camera shown in FIG. 1.

FIGS. 1 and 2 show a first embodiment according to the invention applied to a single-lens reflex camera provided with a line-of-sight detecting function. FIG. 1 is a schematic drawing showing an important portion of a single-lens reflex camera and FIG. 2 is a visual field diagram of a finder in the single-lens reflex camera shown in FIG. 1.

Referring to FIG. 1, a reference number 1 designates photographic lenses constituted by plural lenses. A reference number 2 designates a main mirror mounted slantwise to a photographing optical path corresponding to the status of observation and photography or withdrawn. A reference number 3 designates a submirror for reflecting beams transmitted through the main mirror 2 toward the lower portion of the body of a camera. A reference number 4 designates a shutter. A reference number 5 designates a sensitive member constituted by silver halide film, a solid image pickup device, such as CCD and MOS type devices or a camera tube such as a vidicon.

A reference number 6 designates a focal detector adopting a well-known phase difference system constituted by a field lens 6a disposed in the vicinity of an imaged plane, reflecting mirrors 6b and 6c, a secondary imaging lens 6d, an aperture 6e and a line sensor 6f consisting of plural CCDs described later. The focal detector 6 in FIG. 1 detects a focus according to a well-known phase difference system and is constituted so that detection of focus may be enabled in five focus detection areas in a visual field 213 (an observation screen) of a finder as shown in FIG. 2.

A reference number 7 designates a focusing plate disposed on an anticipated plane imaged through the photographic lenses 1 and a reference number 8 designates a pentagonal prism for changing an optical path in the finder. Reference numbers 9 and 10 designate an imaging lens and a photometric sensor, respectively, for measuring the luminance of a target object in the observation screen and the imaging lens 9 relates the focusing plate 7 and the photometric sensor 10 as a conjugate point via a reflected optical path in the pentagonal prism 8.

A reference number 11 designates an eyepiece disposed at the rear of an exit plane of the above-described pentagonal prism and is used for observation of the focusing plate 7 by an eye 15 of a photographer. The eyepiece 11 is provided with an optical divider 11a constituted by a dichroic mirror for transmitting visible radiation and reflecting infrared radiation for instance. A reference number 12 designates a light receiving lens and a reference number 14 designates an image sensor wherein arrays of photoelectric devices, such as CCDs are arranged along two dimensions. The image sensor is arranged so that it and the vicinity of a pupil in an eye 15 positioned in a given location related to the light receiving lens 12 of a photographer may be related as conjugate points.

Reference numbers 13a to 13f designates infrared-emitting diodes functioning as a light source for irradiating an eye 15 of a photographer, respectively, and are arranged around the eyepiece 11 as shown in FIG. 1.

A reference number 21 designates a high-luminance LED for superimposition visible even in a light target object. The light emitted from the LED 21 for superimposition is reflected against a prism 22 for floodlighting and the main mirror 2, bent perpendicularly by an array of minute prisms 7a provided at a displayed portion of the focusing plate 7 and reaches an eye 15 of a photographer through the pentagonal prism 8 and the eyepiece 11.

Minute prisms 7a in an array are formed in positions on the focusing plate 7 corresponding to focus detection areas in the shape of a frame which is irradiated and the minute prisms are irradiated by the LED 21 for superimposition comprising LED-L1, LED-L2, LED-C, LED-R1 and LED-R2 corresponding to the minute prisms. Therefore, light is emitted in focus detection areas 200, 201, 202, 203 and 204 in the visual field 213 of the finder shown in FIG. 2 to indicate focus detection areas. (Hereinafter called superimposed indication.)

A reference number 23 designates a visual field mask forming a finder visual field area and a reference number 24 designates an LCD in the finder irradiated by an irradiating LED (F-LED) 25 for displaying photographic information outside the finder visual field. The light transmitted through the LCD 24 in the finder is led into the finder by a triangle prism 26, displayed in 207 outside the finder visual field shown in FIG. 2 and a photographer watches photographic information.

A reference number 31 designates an aperture provided in the photographic lenses 1 and a reference number 32 designates an aperture driving device comprising an aperture drive circuit 111, described later. A reference number 33 designates a motor for driving lenses and a reference number 34 designates a lens driving member comprising a driving gear. A reference number 35 designates a photocoupler for detecting rotation of a pulse plate 36 interlocked with the lens driving member 34 and transmitting it to a lens focusing circuit 110.

The lens focusing circuit 110 signals to drive the motor for driving lenses 33 by a given amount based upon such information and information of a lens driven amount sent from a camera and to move a focused lens 1a of photographic lenses 1 in the focused position. A reference number 37 designates contacts functioning as a well-known interface between a camera and lenses.

Figures 3, 3A:
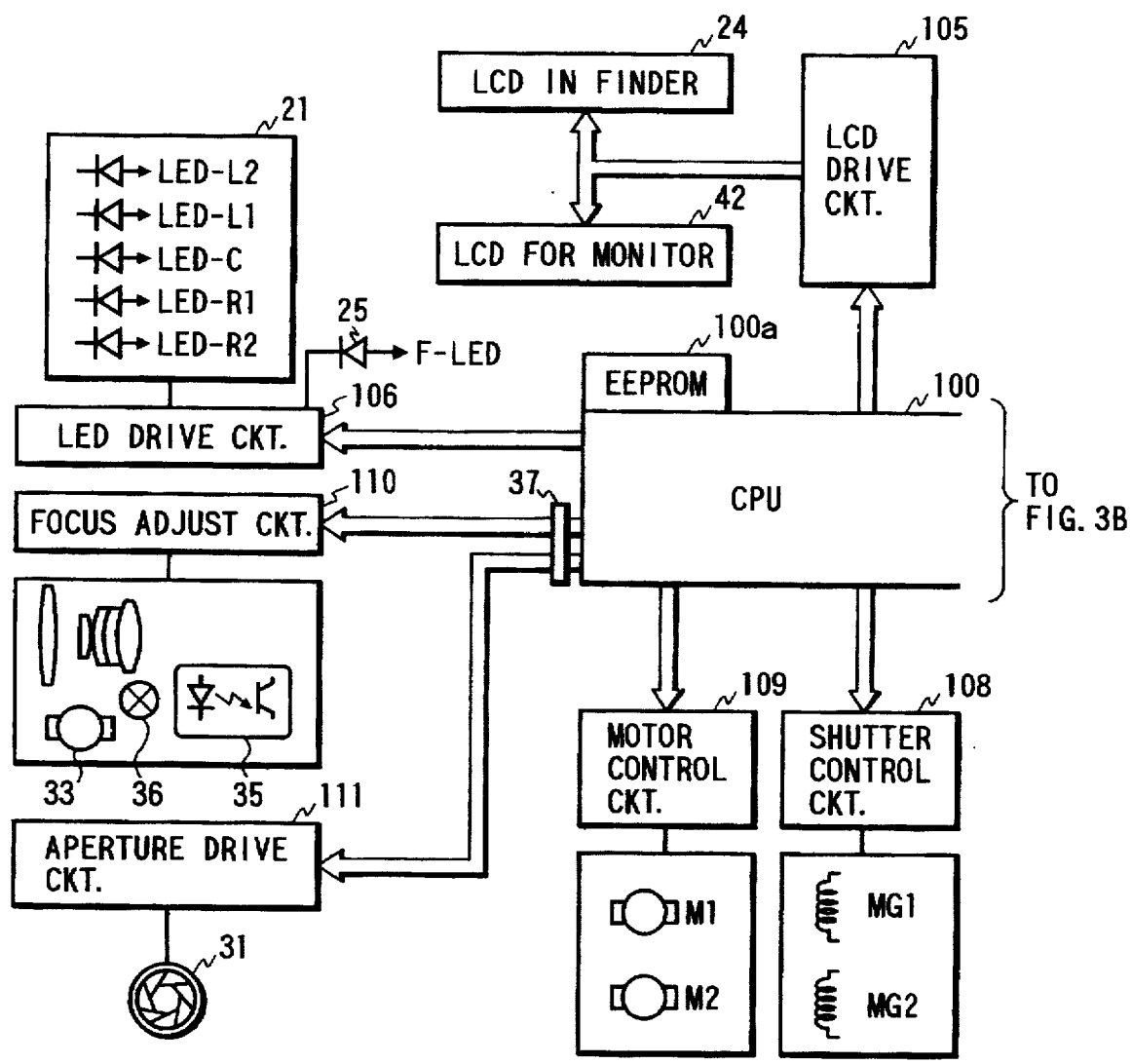
FIG. 3 is comprised of FIGS. 3A and 3B showing block diagrams illustrating the configuration of the electronic components of the camera shown in FIG. 1.
Figure 3B:
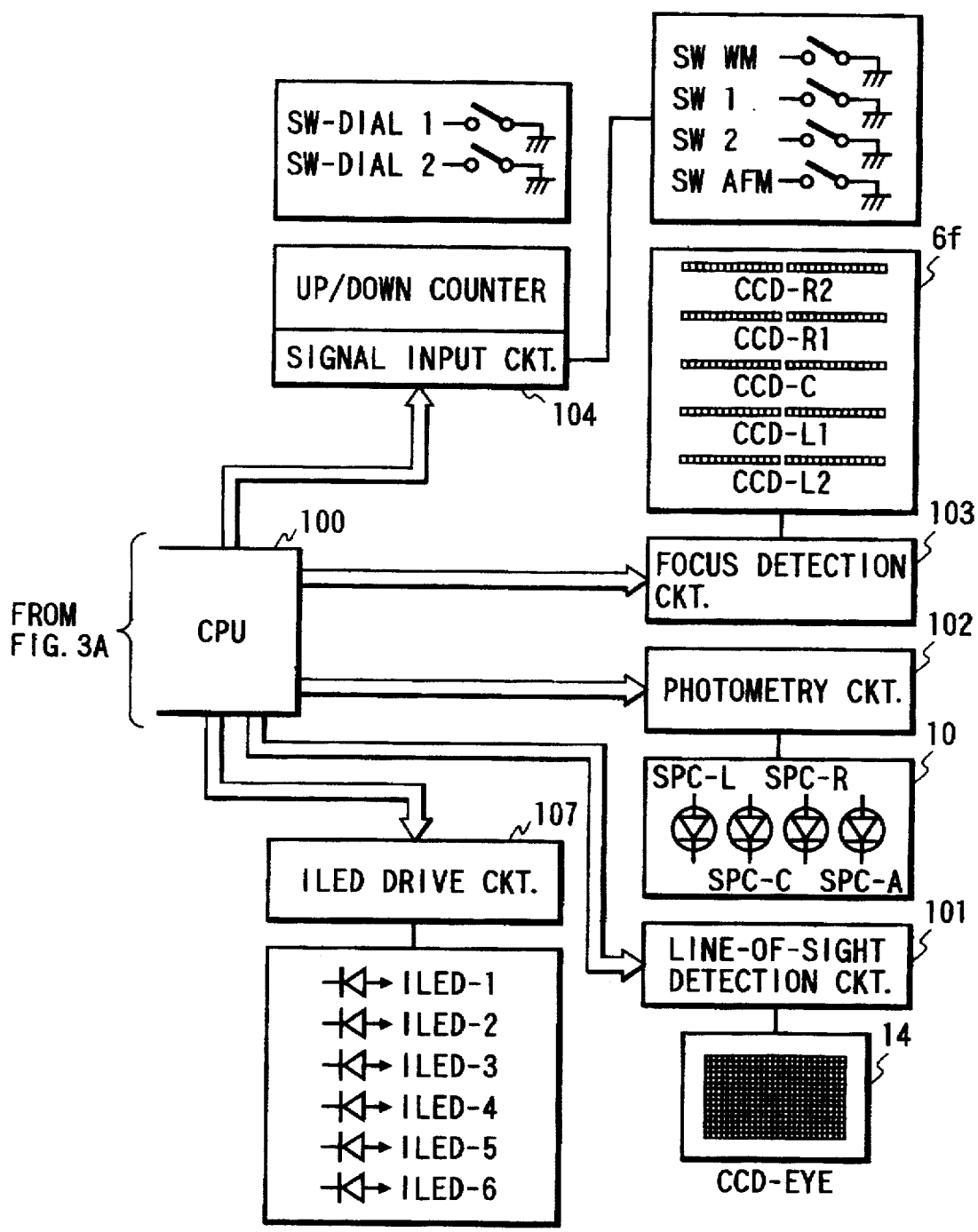

FIGS. 3A and 3B are block diagrams showing the configuration of the electrical components of a single-lens reflex camera constituted as described above and the same numbers as in FIGS. 1 and 2 are given to parts similar to the ones in FIGS. 1 and 2 in FIGS. 3A and 3B.

Referring to FIGS. 3A and 3B, a line-of-sight detection circuit 101, a photometry circuit 102, an automatic focus detection circuit 103, a signal input circuit 104, an LCD drive circuit 105, an LED drive circuit 106, an IRED drive circuit 107, a shutter control circuit 108 and a motor control circuit 109 are connected to a central processing unit 100 (hereinafter called CPU) of a microcomputer functioning as a camera controlling means built in the body of a camera, respectively. Signals are also transmitted between the CPU and the focus adjust circuit 110 or the aperture drive circuit 111 disposed in the photographic lenses 1 via contacts 37 shown in FIG. 1.

EEPROM 100a as a storing means attached to CPU 100 is provided with a function for storing line-of-sight adjustment data for adjusting the individual difference of the line of sight.

The above-described line-of-sight detection circuit 101 converts the output of an image of an eyeball from the image sensor 14 (CCD-EYE) from analog to digital form and sends this image information to CPU 100. CPU 100 extracts the characteristics of an image of an eyeball required for detecting the line of sight according to a given algorithm, as described later, and further processes a rotated angle of the eyeball of a photographer based upon the extracted characteristics.

After the above-described photometry circuit 102 amplifies the output from the photometric sensor 10, it performs log compression and A/D conversion and sends the result to CPU 100 as luminance information from each sensor. The photometric sensor 10 comprises photodiodes for photometry of four areas consisting of SPC-L for photometry of a left-hand area containing the focus detection areas 200 and 201 on the left side in the finder visual field shown in FIG. 2, CSPC-C for photometry of a central area 211 containing the focus detection area 202, SPC-R for photometry of a right-hand area 212 containing the focus detection areas 203 and 204 on the right side and SPC-A for photometry of these peripheral area 213.

A line sensor 6f, such as a well-known CCD, connected to the above-described automatic focus detection circuit 103, is constituted by five pairs of line sensors, CCD-L2, CCD-L1, CCD-C, CCD-R1 and CCD-R2 corresponding to five focus detection areas 200 to 204 in the screen as described above. The automatic focus detection circuit 103 converts the voltage obtained from the line sensor 6f from analog to digital form and sends the result to CPU 100.

SW1 is turned on when the release button, not shown in a drawing, is pressed by a first stroke and starts photometry, AF and a line-of-sight detecting operation. SW2 is a release switch turned on when the release button, not shown, is pressed by a second stroke. SWAFM is an AF mode switching button, not shown, and every time the button is pressed once, either of "the mode for a static target object" or "the mode for a dynamic target object" is set, by turns, for the AF mode. SWWM is a feed mode setting button, and when the button is pressed, the feed mode is set and the mode is switched by operating an electronic dial, not shown, while the feed mode is set. SW-DIAL1 and SW-DIAL2 are dial switches provided in the electronic dial, not shown, and when they are turned on, an input to an updown (UP/DWN) counter attached to the signal input circuit 104 is performed to count the amount of rotary clicks of the electronic dial.

The above-described LCD drive circuit 105 is configured according to a well-known constitution for displaying data on the liquid crystal display LCD and can display a value of an aperture, a shutter speed per second and a set photographic mode on both LCD42 for a monitor and LCD24 in the finder simultaneously according to a signal from CPU 100.

The above-described LED drive circuit 106 controls lighting and blinking the irradiating LED (F-LED) 25 and LED21 for superimposition. The above-described IRED drive circuit 107 signals to light infrared-emitting diodes (IREDs 1 to 6) 13a to 13f selectively according to the situation.

The above-described shutter control circuit 108 controls a magnet MG-1 for running the forward shutter curtain and a magnet MG-2 for running the rearward shutter curtain when electrified in order to expose the sensitive member by a given quantity of light. The above-described motor control circuit 109 controls a motor M1 for winding and rewinding a film and a motor M2 for charging the main mirror 2 and the shutter 4.

Figure 4:
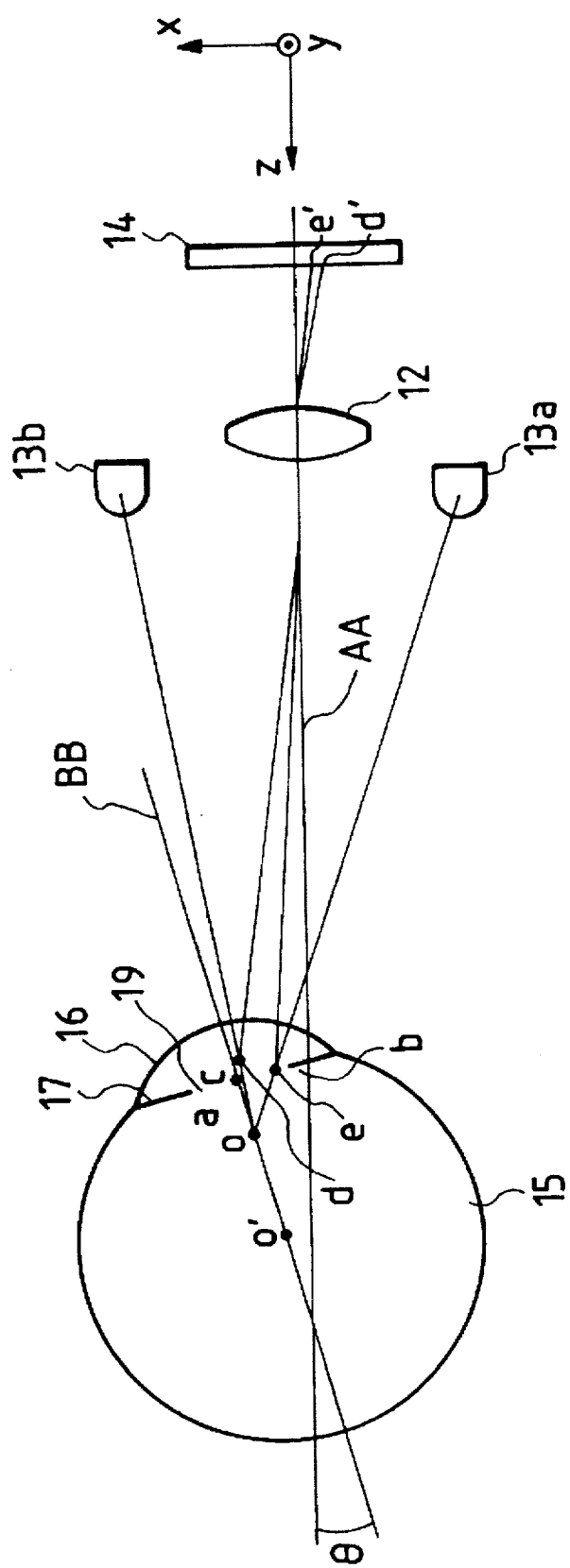
FIG. 4 explains the principle of detecting a line of sight in such a camera.
Figure 5A:
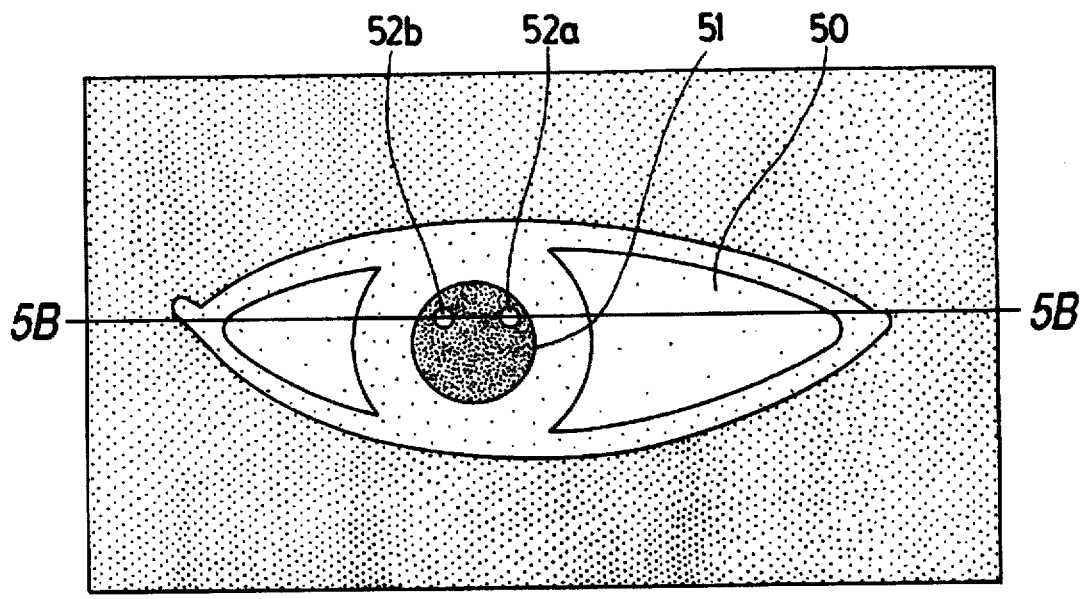
FIGS. 5A and 5B show examples of an image of an eyeball projected on an image sensor and an output of a signal showing the image.

FIG. 4 explains the principle of detecting the line of sight. FIG. 5A shows an image of an eyeball in a normal case projected on the face of the image sensor 14 shown in FIG. 4 and a reference number 60 in FIG. 5B designates an output of an image signal in a line 5B—5B shown in FIG. 5A.

Referring to FIG. 5A, a reference number 50 designates a so-called white portion of an eyeball 15, a reference number designates a pupil and reference numbers 52a and 52b designate an image reflected on a cornea of an eyeball irradiating light source.

Figure 5B:
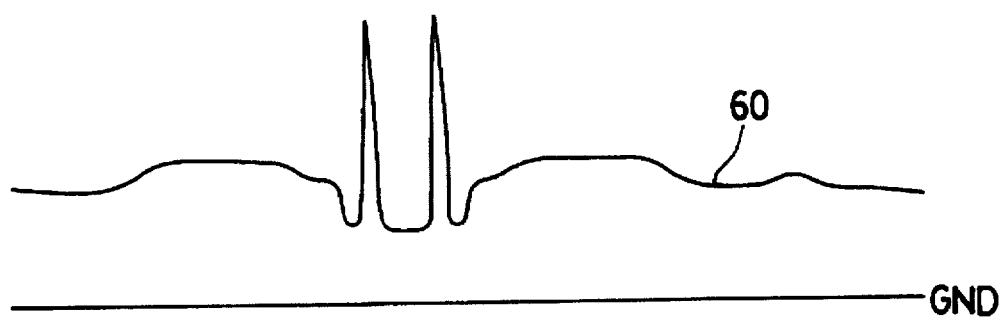

Next, referring to FIGS. 4, 5A and 5B, a line-of-sight detection method will be described.

The infrared-emitting diodes 13a and 13b are disposed approximately symmetrically in the x direction about the optical axis a of the light receiving lens 12 in order to irradiate each eyeball 15 of a photographer, diverging.

Infrared rays projected from the above-described infrared-emitting diode 13b irradiate the cornea 16 of an eyeball 15, and a reflected image d on the cornea by a part of the respective infrared rays reflected on the surface of the cornea 16 at this time is converged by the light receiving lens 12 and is imaged at the position d' on the image sensor 14 again.

Similarly, infrared rays projected from the infrared-emitting diode 13a irradiate the cornea 16 of an eyeball 15, and a reflected image e on the cornea by a part of the respective infrared rays reflected on the surface of the cornea 16 at this time is converged by the light receiving lens 12 and is imaged at the position e' on the image sensor 14 again.

A luminous flux from the end portions a and b of an iris 17 images the end portions a and b in positions a' and b', not shown, on the image sensor 14 through the light receiving lens 12. If x coordinates of the end portions a and b of the iris 17 are designated as xa and xb, and if an angle of rotation θ of the optical axis b of an eyeball 15 based upon the optical axis AA of the light receiving lens 12 is small, the coordinates xc of the central position c of the pupil 19 is represented as follows:

$$xc \cong (xa+xb)/2.$$

If x coordinates of the original positions of reflected images d and e on the cornea are designated as xd and xe and a standard distance between the center O of curvature of the cornea 16, and the center c of the pupil 19 is called $L_{oc}$ and the coefficient in which the individual difference of the distance $L_{oc}$ is considered is called A1 because the x coordinate of the central point between reflected images d and e on the cornea and the x coordinate of the center O of curvature of the cornea 16 xo are equal, an angle of rotation θ of the optical axis BB of an eyeball 15 approximately satisfies the relational expression as follows:

$$(A1*L_{oc})*\sin\theta \cong xc-(xd+xe)/2 \qquad (1)$$

Therefore, an angle of rotation θ of the optical axis BB of an eyeball 15 can be obtained by detecting the positions of images projected on a part of the image sensor 14, such as reflected images d and e on the cornea and the end portions a and b of the iris 17 by the line-of-sight detection circuit 101. At this time, the expression shown as (1) above can be rewritten as follows:

$$\beta(A1*L_{oc}) \times \sin\theta \cong (xa'+xb')/2 - (xd'+xe')/2 \qquad (2)$$

However, β represents a determined magnification based upon the position of an eyeball 15 with respect to the light receiving lens 12 and is substantially obtained as a function of the distance |xd'−xe'| between the infrared-emitting diodes 13a and 13b and reflected images on the cornea. An angle of rotation θ of the optical axis BB of an eyeball 15 can be rewritten as follows:

$$\theta \cong ARCSIN\{(xc'-xf')/\beta/(A1*L_{oc})\} \qquad (3)$$

However, xc' and xf' shall be as follows:

$$xc' \cong (xa'+xb')/2$$

$$xf' \cong (xd'+xe')/2.$$

However, when the angle of rotation θ in the horizontal direction of the optical axis BB is calculated because in many cases the visual line and the optical axis BB of an eyeball 15 of a photographer are not equal, a line of sight θH in the horizontal direction of the photographer is obtained by compensating for an angle δ between the optical axis BB and the visual line. If the coefficient in which the individual difference of an angle δ compensated for between the optical axis BB and the visual line of an eyeball 15 is considered is called B1, a line of sight θH in the horizontal direction of the photographer is represented as follows:

$$\theta H = \theta \pm (B1*\delta) \qquad (4)$$

For a sign ±, if an angle of clockwise rotation concerning a photographer is taken to be positive, "+" is selected if the eye of a photographer which looks into the finder is the left one and "−" is selected if the right eye looks into the finder.

In FIG. 4, an example in which an eyeball of a photographer is rotated on a z-x plane (for example, a horizontal plane) is also shown, however, the line of sight can be detected similarly in case the eyeball of the photographer is rotated on a z-y plane (for example, a vertical plane). However, as a component in the vertical direction of a line of sight of a photographer is equal to a component θ' in the vertical direction of the optical axis BB of an eyeball 15, the line of sight θV in the vertical direction is represented as follows:

$$\theta V = \theta'.$$

Further, the positions (xn, yn) at which a photographer looks on the focusing plate in the finder visual field based upon line-of-sight data θH and θV are represented as follows:

$$\begin{aligned} xn &\cong m*\theta H \\ &\cong m*[ARCSIN\{(xc'-xf')/\beta/(A1*L_{oc})\} \pm \\ &\quad (B*\alpha)] \\ yn &\cong m \times \theta V \end{aligned} \qquad (5)$$

However, "m" represents a constant determined in a finder optical system of a camera.

Values of coefficients A1 and B1 for compensating the individual differences of an eyeball 15 of a photographer are obtained by equalizing the position of a target disposed in a given position in the finder of a camera with the position of the gazed point calculated according to the expression (5) above while the photographer gazes at the target.

Normally, the operation for obtaining the line of sight of a photographer and a point at which he/her gazes is executed according to the above-described expressions by software running on a microcomputer for a line-of-sight processor.

When the coefficient for compensating for the individual differences of the line of sight is obtained, the position on the focusing plate of a line of sight of a photographer who looks into the finder of a camera is calculated using the expression (5) above and the line-of-sight information is used for focusing a photographic lens or controlling exposure.

Next, the operation of a camera constituted as described above will be explained using the flowcharts shown in FIGS. 6 to 8.

First, the flowchart in FIG. 6 will be described.

When a camera feeding operation occurs, CPU 100 starts operation from a step 601.

[Step 602] Initialize variables and flags.

"A line-of-sight detection inhibit flag", "an AF inhibit flag" and "an after-release flag" are cleared. "An interrupt of release & feeding" is disabled.

[Step 603] Detect the status of a switch SW1 to be turned on when a release button is pressed by a first stroke. If it is turned off, proceed to a step 604 and if turned on, proceed to a step 611.

Suppose the switch SW1 is turned off and control is passed to a step 604.

[Step 604] Initialize variables and flags. Here, initialize them if the switch SW1 is released again after SW1 is pressed and a given operation is performed.

Clear "a line-of-sight detection inhibit flag" to detect the line of sight. Also, clear "an AF inhibit flag" to perform AF. Further, disable "an interrupt of release & feeding". Also clear "an after-release flag".

[Step 605] Check whether the feed mode is set to a camera currently (the feed mode is set when a switch SWWM is pressed) or not. As a result, if the feed mode is set, proceed to a step 606 and if not, proceed to a step 608.

[Step 606] Check whether a dial has been operated or not. If a dial has not been operated, proceed to a step 613 without switching the feed mode and if a dial points a different type, proceed to a step 607.

[Step 607] As a dial has been operated, change the feed mode and after setting of the feed mode is finished, proceed to a step 613.

The above-described feed mode has two types of "a one-shot mode" in which only one frame is photographed when a switch SW2 is pressed and "a continuous-shot mode" in which photography is performed continuously while a switch SW2 is pressed. A camera user can always switch "a one-shot mode" and "a continuous-shot mode" with a dial operation.

If the feed mode is not set in a step 605, proceed to a step 608 as described above.

[Step 608] Judge whether the AF mode is switched in a camera here. If it is switched, proceed to a step 609 and if not, proceed to a step 610.

[Step 609] Switch the AF mode and after setting of the AF mode is finished, proceed to a step 613. When a switch SWAFM is pressed, the AF mode is switched and the setting is finished by releasing the switch SWAFM.

The AF mode has two types, i.e., "a mode for a static target object" and "a mode for a dynamic target object" as described above. In the "mode for a static target object", the AF mode is switched to "a mode for a dynamic target object" and in the "mode for a dynamic target object", the AF mode is switched to "a mode for a static target object" respectively.

[Step 610] Perform setting other than the feed mode and the AF mode here. As the details thereof are not related to the invention directly, they will be omitted.

In the above-described step 603, if the switch SW1 is turned on, proceed to a step 611 as described above.

[Step 611] Execute "AE control" subroutine for photometry and display the status of a camera here. In this subroutine "AE control", a photometric sensor is operated and a shutter speed and a value of an aperture are calculated based upon the obtained photometric value according to a known algorithm. The calculated shutter speed and value of an aperture are displayed on a liquid crystal display provided outside a camera (when the photographic mode of the camera is in the manual mode, it is displayed, whether the mode is appropriate or not).

[Step 612] Execute "detection of the line of sight and of a focus" subroutine here. This subroutine, "detection of the line of sight and of the focus" is executed repeatedly while the switch SW1 is turned on.

[Step 613] When the sequence of operations is finished, return to the step 603 from here in order to repeat the operations of a camera.

Next, release operation will be described referring to FIG. 7. However, the release operation is executed by an interrupt routine.

[Step 651] When the switch SW2 is turned on by pressing the release button by a second stroke while interruption is enabled, the "release & feeding" subroutine is called by interruption processing.

[Step 652] Disable an interrupt of "release & feeding".

[Step 653] Calculate a value of an aperture to be controlled and a shutter speed here.

An aperture and a shutter speed are calculated based upon the photographic mode of a camera and the value by photometry or a set value according to given algorithm. If a value of an aperture and a shutter speed are preset, no calculation here is required.

[Step 654] Lift the main mirror (2) and the submirror (3) of a camera, communicate with the aperture drive circuit 111 and control an aperture 31 provided in lenses to the value calculated in the above step 653.

[Step 655] Electrify the magnet MG-1 via the shutter control circuit 108 and start exposure running the forward shutter curtain. Then, electrify the magnet MG-2 after a given time calculated in the above step 653 elapses and terminate exposure running the rearward shutter curtain.

[Step 656] Lower the mirror to a given position, communicate with the aperture drive circuit 111 and return the aperture to a release position.

[Step 657] Feed one frame of film and charge a shutter spring.

[Step 658] Clear "the line-of-sight detection inhibit flag" and "an AF inhibit flag" in order to detect the line of sight and the focus when "the line of sight detecting" subroutine is called here.

[Step 659] Set an "after-release" flag showing that release is performed.

[Step 660] Terminate an interrupt subroutine of "release & feeding".

Figure 6:
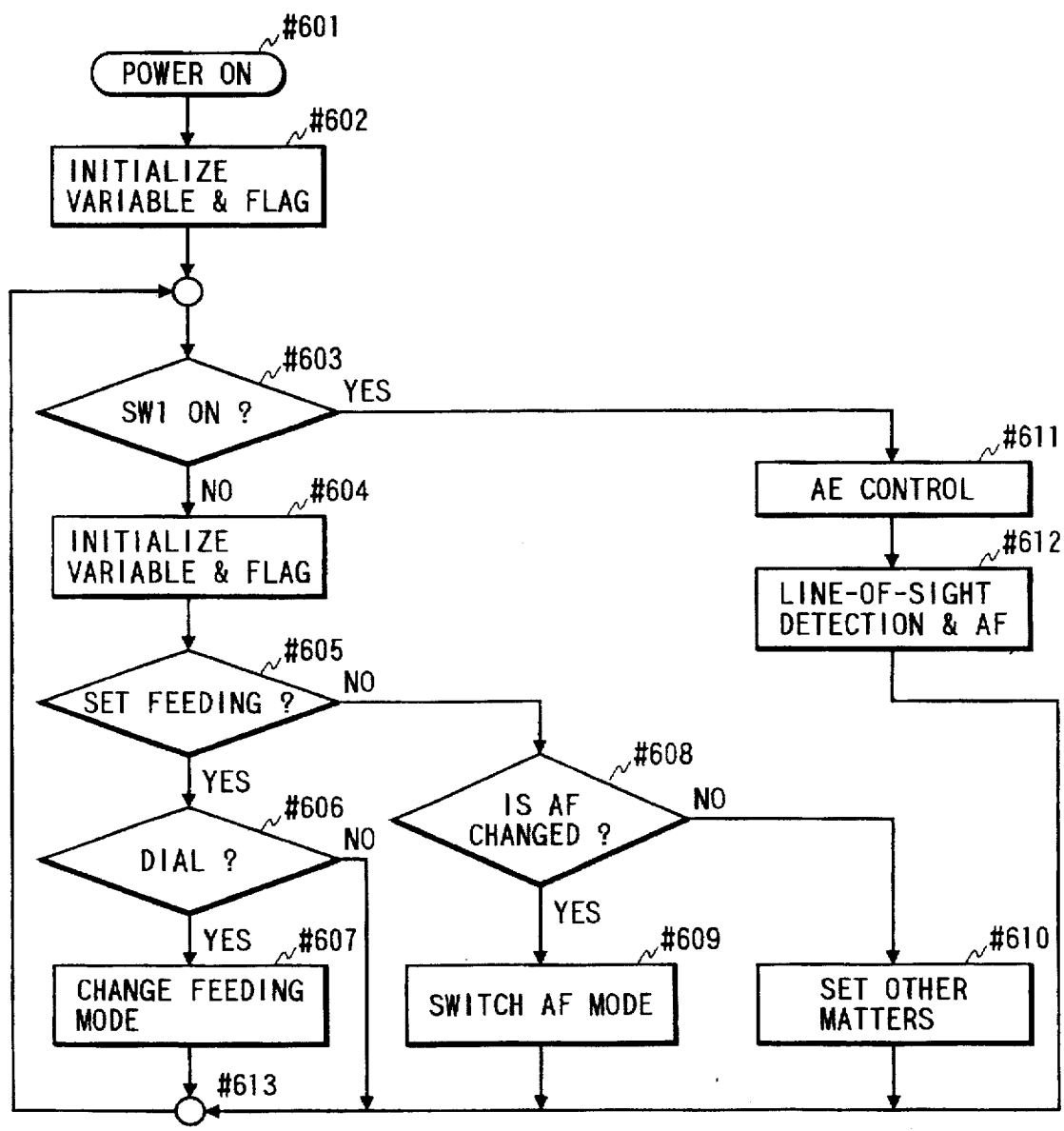
FIG. 6 is a main flowchart showing a sequence of steps according to which the camera shown in FIG. 1 is operated.

After the "release & feeding" subroutine is finished, return not to the program in which interruption occurs but to the step 603 in FIG. 6.

Next, a flowchart of the "line-of-sight detection & AF" subroutine in the step 612 in FIG. 6 will be explained.

When "line-of-sight detection & AF" is called, CPU 100 performs operation from the step 502 via the step 501.

[Step 502] Communicate with the focusing circuit 110 to determine whether a lens is driven currently or not. As a result, if driving of the lenses is not finished in case the "line-of-sight detection & AF" subroutine is executed and the lenses are driven a last time, return to this subroutine. Before the lenses are driven or after driving of the lenses is finished, proceed to a step 503.

[Step 503] Determine whether release is performed or not and if release is performed, proceed to a step 504. If release is not performed, proceed to a step 505.

[Step 504] Determine whether the feed mode is in a one-shot mode or not here and if so, return to this subroutine. If it is a continuous-shot mode, proceed to a step 505.

As described above, a camera is controlled by the determination in steps 503 and 504 so that only one frame can be photographed in the one-shot mode.

[Step 505] Determine whether line-of-sight detection is permitted or not here. It is determined by "a line-of-sight detection inhibit flag" whether line-of-sight detection is inhibited. As it is permitted at first, proceed to a step 506. If line-of-sight detection is inhibited, proceed to a step 509 immediately without performing a line-of-sight detecting operation.

[Step 506] Detect a line of sight according to a given algorithm.

First, illuminate infrared-emitting diodes whose positions are predetermined corresponding to the position of a camera by IRED drive circuit 107 (two or four of IRED-1 to IRED-6). Next, start charging operation of CCD-EYE 14 by the line-of-sight detection circuit 101. If charge is finished, CPU 100 reads an amount of stored charge in turn, converts it from analog to digital form and performs processing according to a given algorithm. The CPU performs processing for overall pixels of CCD-EYE 14 and obtains the coordinates of reflected images on the cornea shown by 52a and 52b in FIG. 5 of beams from a light source for irradiating an eyeball and the central coordinates of the pupil 51. The coordinates of the point gazed at by a photographer are obtained by an operation according to the above-described algorithm.

[Step 507] Once the line of sight is detected, inhibit line-of-sight detection so that it may not be repeated. Line-of-sight detection is inhibited by setting "a line-of-sight detection inhibit flag".

[Step 508] Decide an area for detecting a focus based upon the coordinates of the gazed point detected in the above step 506. The decided focus detection area is stored and is held until a line of sight is detected again and an area is selected.

[Step 509] Determine whether line-of-sight detection is permitted or not by "an AF inhibit flag". As "an AF inhibit flag" is set while the switch SW1 remains held once focused, proceed to a step 515 and return to this subroutine. If "an AF inhibit flag" is not set, proceed to a step 510.

[Step 510] Detect focus here. Detect focus in the focus detection area selected in the above step 508 of plural focus detection areas.

[Step 511] Determine whether the detected focus is in focus or not. Judge the focus is focused if an amount of defocus obtained in detecting focus is less than a predetermined amount. If focused, proceed to a step 512 and if not, proceed to a step 514.

[Step 512] Display a mark showing the detected focus is in focus to inform a photographer of it.

Illuminate an irradiating LED (F-LED) 25 to light a mark 79 (see FIG. 2) showing a detected focus is in focus in the LCD 24 in the finder via the LCD drive circuit 105.

[Step 513] Enable an interrupt of "release & feeding" because a detected focus is in focus and when the switch SW2 is pressed, enable a release operation by an interrupt. Further, set "an AF inhibit flag" to disable a second detection of a focus.

[Step 514] As it is determined in the above step 511 that a detected focus is not in focus, drive a lens here.

Concretely, obtain the amount the lenses are to be driven based upon the amount of defocus detected in detecting a focus in the above step 510 and send it to the focusing circuit 110. The focusing circuit 110 drives the motor 33 for driving a lens, monitoring the focusing plate 36 and the photocoupler 35 in order to drive lenses equivalent to the sent amount the lenses are to be driven. CPU 100 is not required to monitor the amount the lenses are to be driven after it communicates the data to the focusing circuit 110 and can perform another operation, other than driving lenses. Therefore, when communication with the focusing circuit 110 is finished, proceed to a step 515.

[Step 515] Terminate this subroutine, "line-of-sight detection & AF" and return.

Referring to the above-described first embodiment, in the one-shot mode, the line of sight is detected only first to decide focus detection areas and a focus detecting operation and a focusing operation are performed in the selected focus detection areas. In the meantime, in the continuous-shot mode, the line of sight is detected to determine focus detection areas every time a frame is photographed and a focus detecting operation and a focusing operation are performed in the selected focus detection areas. Therefore, in the continuous-shot mode, a camera provided with a line-of sight detecting function performs detecting of the focus and focusing in focus detection areas into which a line of sight is input without causing a deterioration in the continuing focusing operation and in the continuous-shot speed.

Second Embodiment

Figure 8:
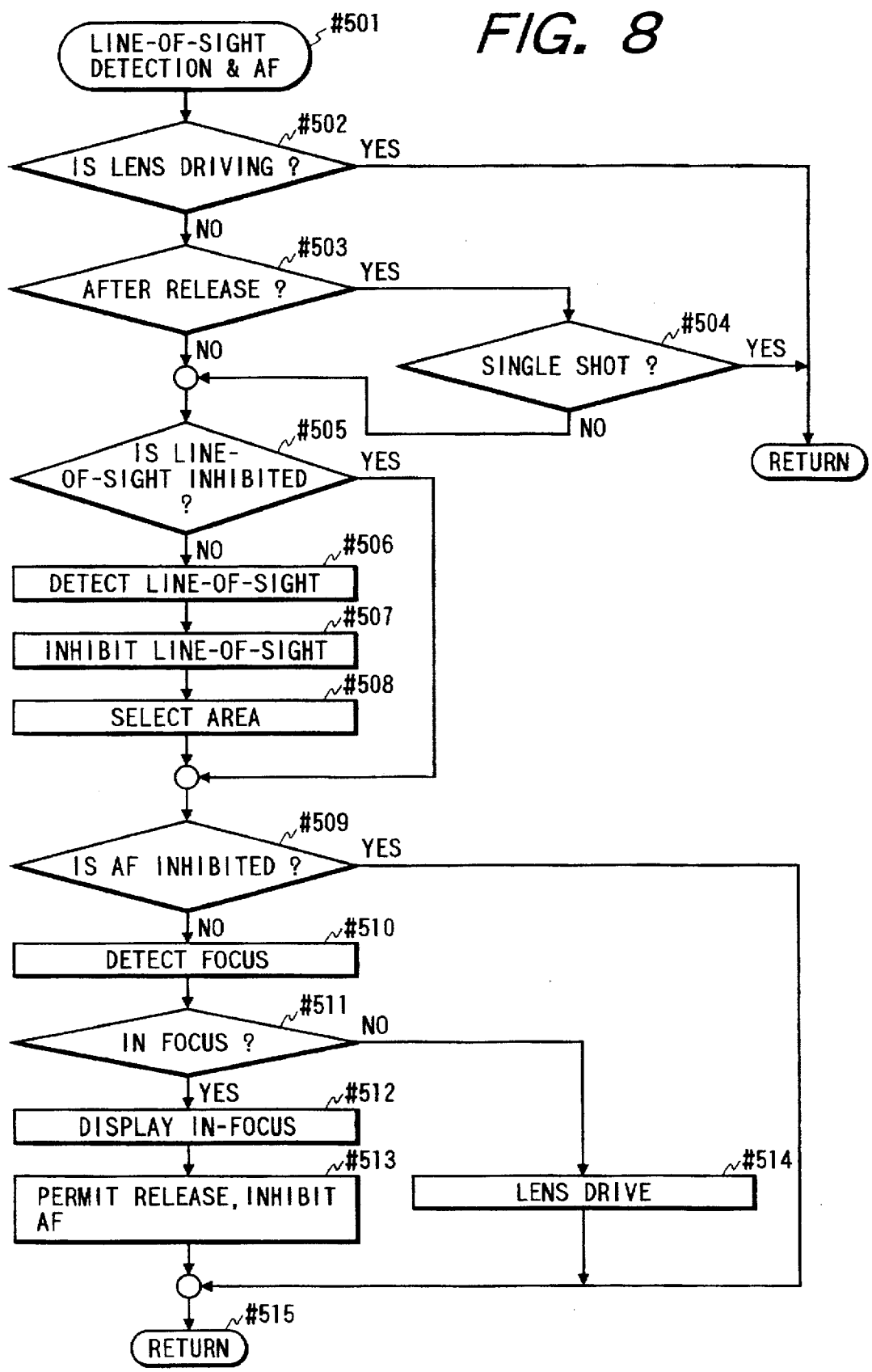
FIG. 8 is a flowchart showing the operation of "detection of a line of sight & AF" executed in a step 612 in FIG. 7.
Figures 9, 9A:
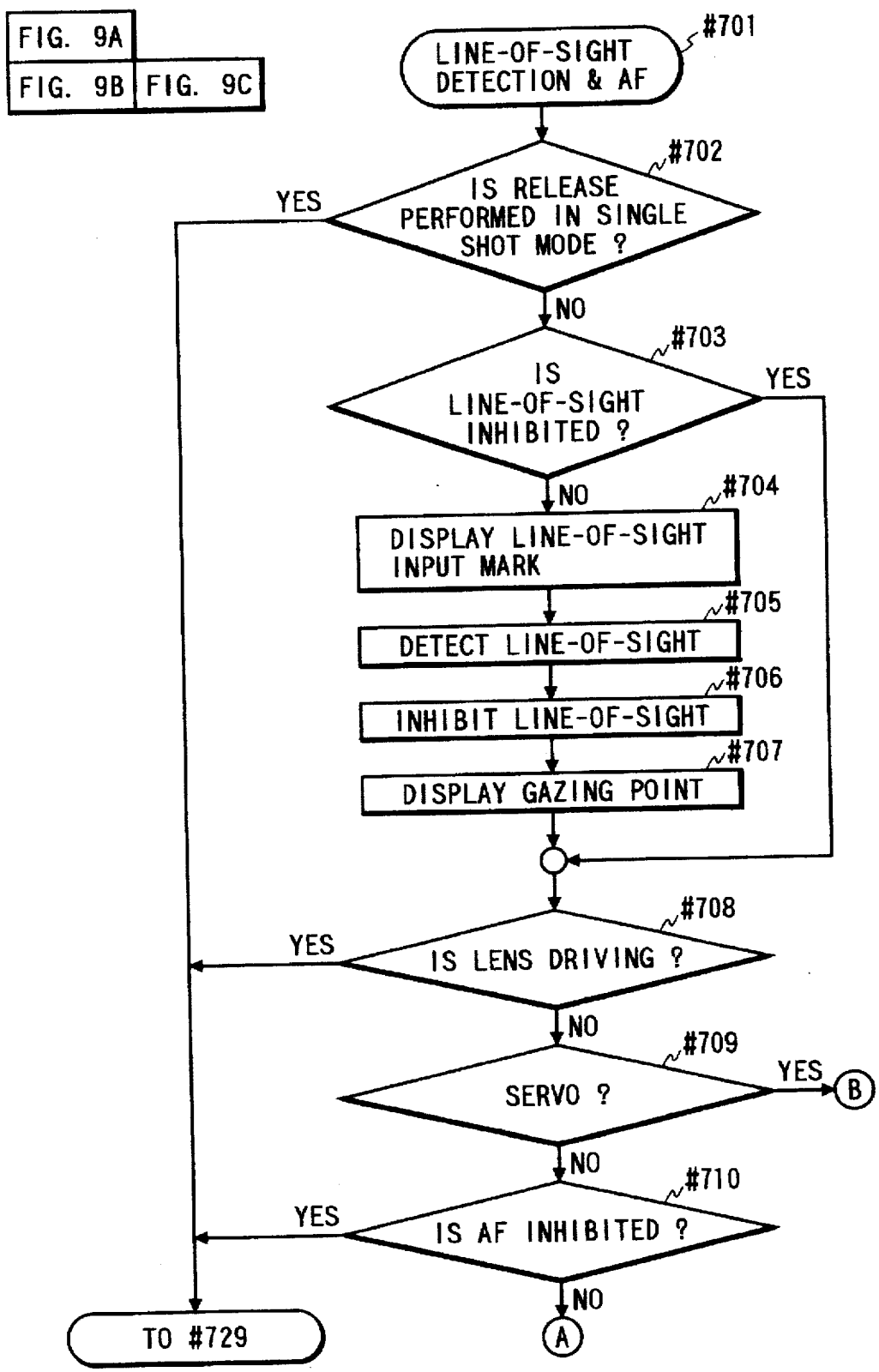
FIG. 9 is comprised of FIGS. 9A to 9C showing flowcharts illustrating the operation of "line-of-sight detection & AF" according to a second embodiment in case the invention is applied to a single-lens reflex camera.
Figure 9B:
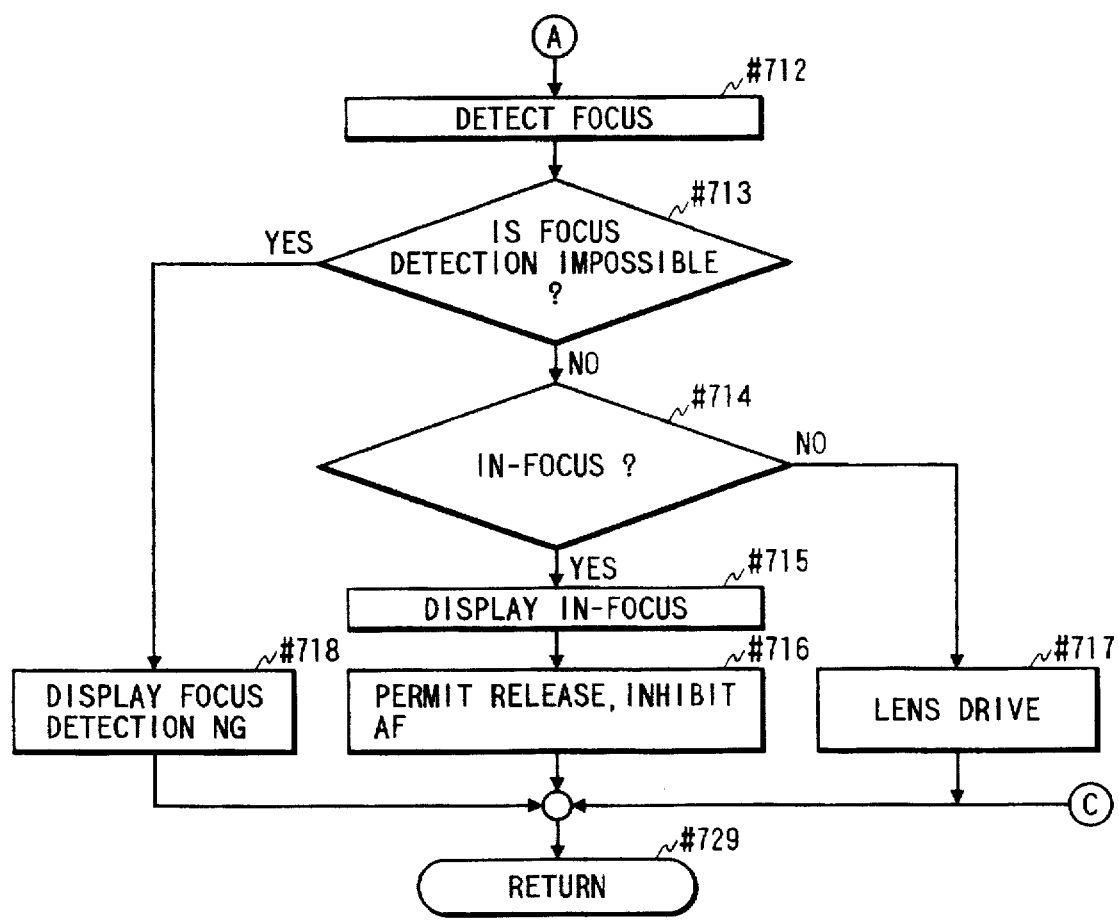
Figure 9C:
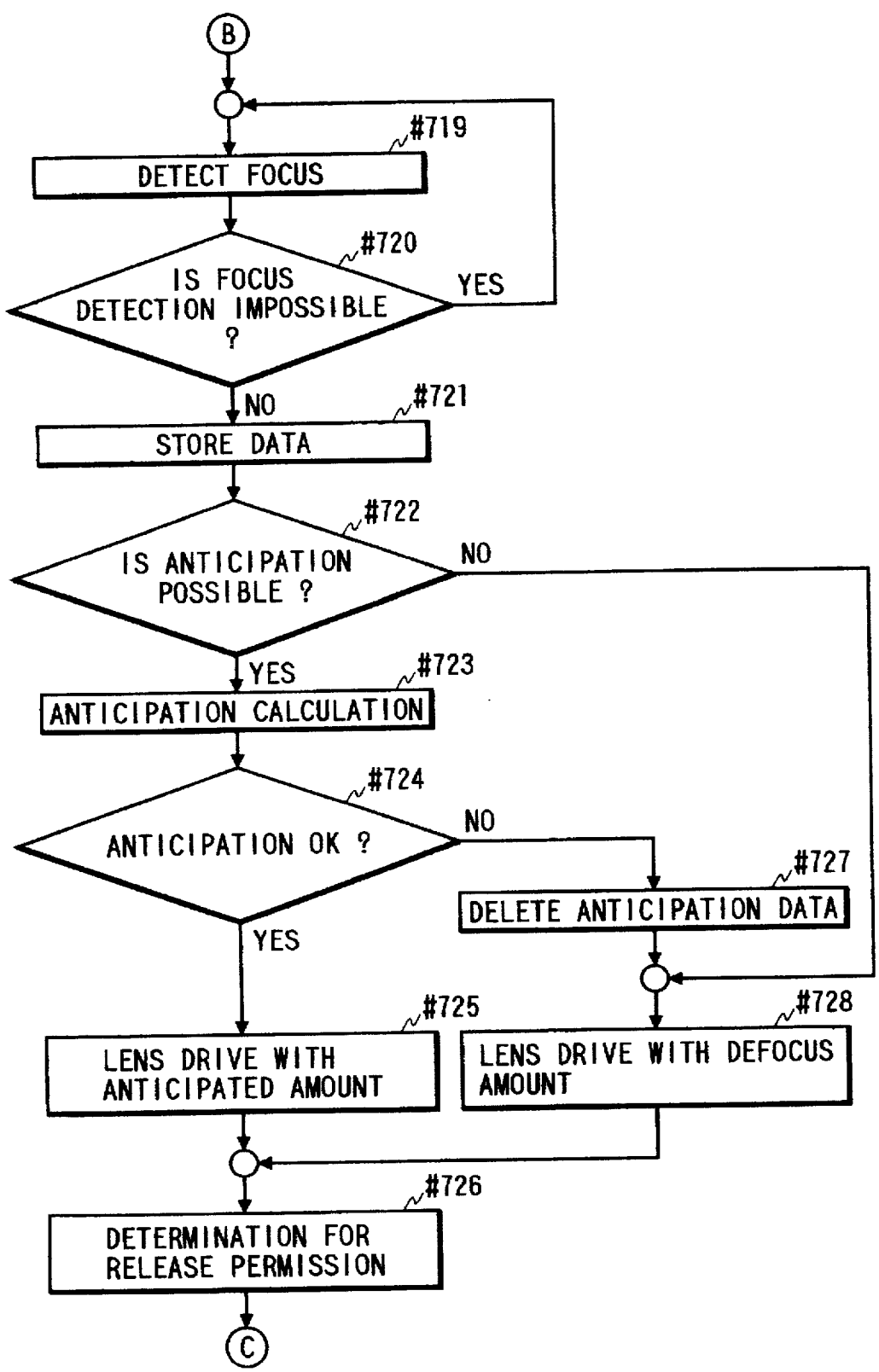
Figure 10:
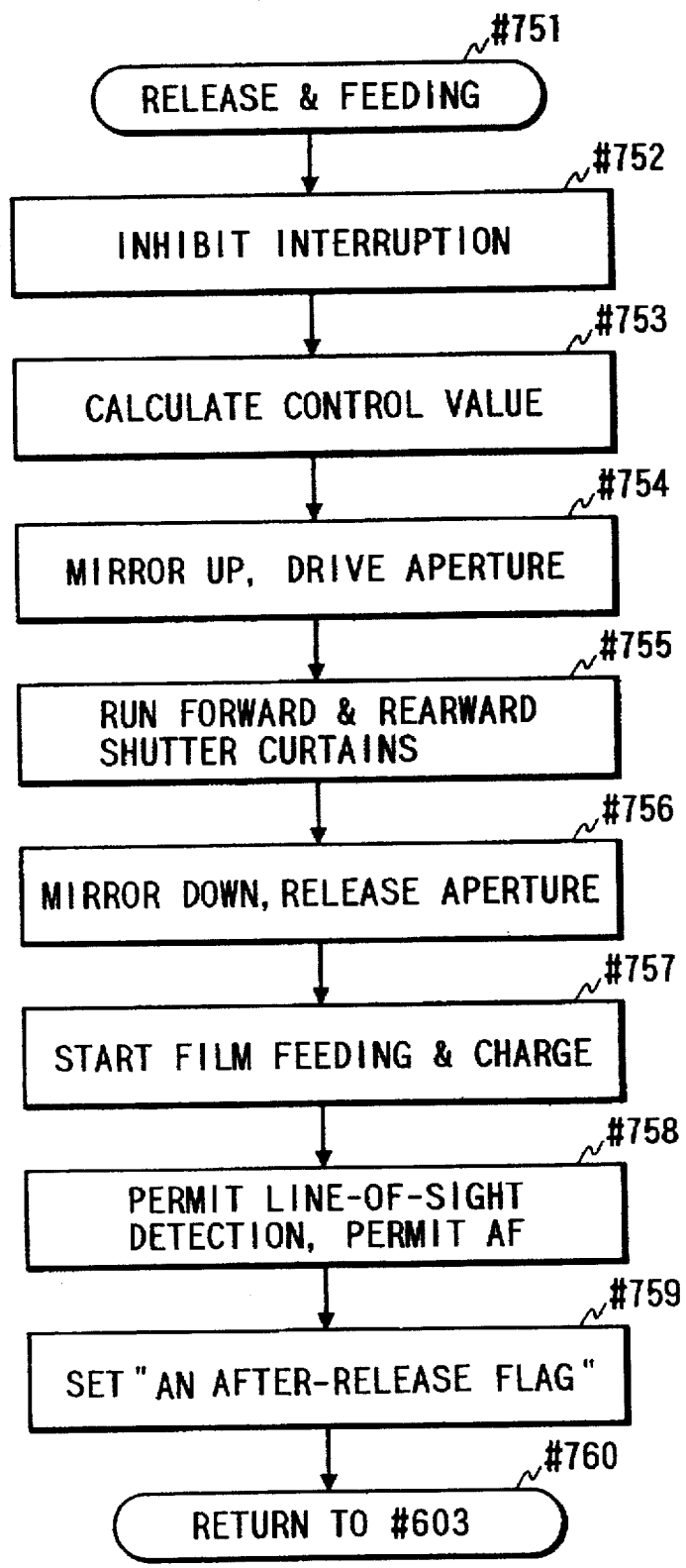
FIG. 10 is a flowchart showing the operation of "release & feeding" according to the second embodiment in case the invention is applied to a single-lens reflex camera.

FIGS. 9A through 10 are flowcharts showing the operation of the main portion of a second embodiment of the invention. FIGS. 9A to 9C are flowcharts equivalent to FIG. 8 according to the first embodiment and FIG. 10 is a flowchart equivalent to FIG. 7 according to the first embodiment. A description of the elements and operations that are similar to those in the first embodiment, will be omitted.

FIGS. 9A to 9C are flowcharts of the "line-of-sight detection & AF" subroutine in the step 612 in FIG. 6 and first, it will be described.

When "line-of-sight detection & AF" is called, start the operation of the process from a step 702 via a step 701.

[Step 702] Determine whether release is performed in the one-shot mode and if not (if release is performed in the continuous-shot mode), proceed to a step 703. If so (if release is performed in the one-shot mode), proceed to a step 729 and return to this subroutine. A camera is controlled owing to this judgment so that in the one-shot mode, only one frame can be photographed.

[Step 703] Determine whether line-of-sight detection is permitted here. Check whether "a line-of-sight detection inhibit flag" is set or not to determine whether line-of-sight detection is inhibited or not. As line-of-sight detection is permitted at first, proceed to a step 704. If line-of-sight detection is inhibited, branch to a step 708 without performing a line-of-sight detecting operation.

[Step 704] Display a mark showing a line of sight is input before line-of-sight detection.

Illuminate the irradiating LED (F-LED) 25 to light a mark 78 (see FIG. 2) showing a line of sight is input in the LCD 24 in the finder via the LCD drive circuit 105. Therefore, a photographer can confirm his/her camera detects a line of sight in 207 outside the finder screen.

[Step 705] Detect a line of sight according to a given algorithm.

First, illuminate infrared-emitting diodes (two or four of IRED1 to IRED6) which are predetermined and correspond to the position of a camera by the IRED drive circuit 107 and next, start a charging operation of CCD-EYE 14 by the line-of-sight detection circuit 101. When charging is finished, CPU 100 reads the stored charge in turn, converts it from analog to digital form and performs processing according to a given algorithm. The CPU performs processing for overall pixels of CCD-EYE 14 and obtains the coordinates of reflected images on the cornea shown by 52a and 52b in FIG. 5A of beams from the light source for irradiating an eyeball and the central coordinates of the pupil 51. The coordinates of the point gazed at by a photographer are obtained by operating these according to the above-described algorithm.

[Step 706] Once a line of sight is detected, disable line-of-sight detection to prevent it from being repeated. Line-of-sight detection can be disabled by setting "a line-of-sight detection inhibit flag".

[Step 707] Blink or light focus detection areas using the LED 21 for superimposition driven by sending a signal to the LED drive circuit 106 in order to inform a photographer of focus detection areas selected based upon a line of sight.

[Step 708] Communicate with the focusing circuit 110 to determine whether lenses are being driven or not here. If driving of the lenses is not finished in case the "line-of-sight detection & AF" subroutine is executed a last time and lenses are driven, proceed to a step 729 here and return to this subroutine. Before lenses are driven or after driving of the lenses is finished, proceed to a step 709.

[Step 709] Determine whether the AF mode is "a mode for a static target object" or "a mode for a dynamic target object" here. If it is "a mode for a static target object", proceed to a step 710 and if it is "a mode for a dynamic target object", proceed to a step 719.

Suppose the AF mode is "a mode for a static target object" and control is passed to a step 710 here.

[Step 710] Check whether "an AF inhibit flag" is set or not in order to determine whether detection of focus is permitted or not. As "an AF inhibit flag" is set while the switch SW1 remains held once focused, proceed to a step 729 and return to this subroutine. If "an AF inhibit flag" is not set, proceed to a step 712.

As in the "mode for a dynamic target object", "an AF inhibit flag" is not set, determine whether detection of focus is permitted or not after the AF mode is determined in the step 709. That is, only in the "mode for a static target object", determine whether detection of a focus is permitted or not here.

[Step 712] Detect a focus. In detail, detect a focus in focus detection areas selected based upon detected lines of sight of plural focus detection areas.

[Step 713] Determine whether a focus is detected in focus detection areas in the above step 712 or not. If focus cannot be detected, proceed to a step 718 and if it can be detected, proceed to a step 714.

[Step 714] Determine whether the detected focus is in focus or not. Determine it is focused if an amount of defocus obtained in detecting focus is within a given amount. If focused, proceed to a step 715 and if not, proceed to a step 717.

[Step 715] Display a mark showing the detected focus is in focus to inform a photographer of it.

Illuminate the irradiating LED (F-LED) 25 to light a mark 79 (see FIG. 2) showing a detected focus is in focus in the LCD 24 in the finder by the LCD drive circuit 105.

[Step 716] As a detected focus is in focus, enable an interrupt of "release & feeding" and when the switch SW2 is pressed, perform a release operation by an interrupt. Further, set "an AF inhibit flag" to prevent a second focus from being detected.

If a detected focus is not in focus in the above step 714, proceed to a step 717.

[Step 717] Drive lenses here. Obtain the amount the lenses are to be driven based upon an amount of defocus detected in the above step 712 and communicate it to the focusing circuit 110. The focusing circuit 110 drives the motor for driving lenses 33, monitoring the pulse plate 36 and the photocoupler 35 to drive lenses by the communicated amount the lenses are to be driven. CPU 100 is not required to monitor the amount the lenses are to be driven after the data is communicated to the focusing circuit 110 and therefore, can perform another operation, other than driving lenses. Therefore, proceed to a step 729 when communication with the focusing circuit 110 is finished.

If it is determined that a focus could not be detected in the above step 713, proceed to a step 718 as described above.

[Step 718] Display AF is disabled to inform a photographer that a focus could not be detected. Blink a mark 79 showing a detected focus is in focus in the LCD 24 in the finder to display AF is disabled.

If it is determined in the above step 709 that the AF mode is "a mode for a dynamic target object", proceed to a step 719 as described above.

[Step 719] Detect a focus. In detail, detect a focus in focus detection areas selected based upon detected lines of sight of plural focus detection areas.

[Step 720] Determine whether a focus could not be detected in the above step 719 or not. If a focus could not be detected, return to the step 719 to detect a focus again. If a focus could be detected, proceed to a step 721.

[Step 721] Store or update defocus data and the timing at which the focus is detected to anticipate movement of a target object.

[Step 722] Operate based upon the past focus detection data for plural times according to a given algorithm to anticipate movement of a target object. Therefore, determine whether the past data is sufficient or not here. If the data is sufficient and movement of a target object can be anticipated, proceed to a step 723 and if the data is insufficient, proceed to a step 728.

[Step 723] Obtain the defocused position of a target object when a shutter curtain is actually run since the switch SW2 is turned on based upon the defocus amount detected this time, the defocus amounts stored in the past, lens drive amounts, an interval of detection of a focus and release time lag according to a given algorithm.

[Step 724] Determine whether the calculated anticipated defocus amount is appropriate or not. If the anticipated defocus amount is larger than a fixed threshold value or the direction is inverted, proceed to a step 727 because the anticipated result is not appropriate. If a lens drive amount is "0" plural times, branch to the step 727 similarly because a target object is static. In the meantime, if the anticipated result is appropriate, proceed to a step 725.

[Step 725] Convert the anticipated defocus amount to an amount the lenses are to be driven and drive lenses by communicating the value to the focusing circuit 110.

[Step 726] Determine whether release is permitted or not. If the condition on which release may be permitted is provided, enable "an interrupt of release & feeding". If lenses are driven based upon the anticipated amount, wait for lenses to be stopped in this subroutine and when driving of the lenses is finished, enable "an interrupt of release & feeding". When a lens drive amount is small or "0" in case lenses are driven based upon a defocus amount, enable "an interrupt of release & feeding".

If the anticipated result is not appropriate in the above step 724, proceed to a step 727 as described above.

[Step 727] Delete anticipated data here to initialize anticipation. This is because if anticipation is not appropriate, either data stored in the past or a defocus amount this time may be inappropriate and deleting such data and storing new anticipated data is required.

[Step 728] If anticipation is impossible, drive lenses based upon the newest detected defocus amount. If a lens drive amount is smaller than a given value, lenses are not driven to prevent lenses from being hunched. Then, return to the above step 726.

[Step 729] Terminate this subroutine, "line-of-sight detection & AF" and return.

Next, a release operation according to this embodiment will be described referring to the flowchart in FIG. 10. The release operation is executed by an interrupt routine.

[Step 751] When the switch SW2 is turned on by pressing a release button by a second stroke while interruption is enabled, "release & feeding" subroutine is called by interrupt processing.

[Step 752] Disable an interrupt of "release & feeding".
[Step 753] Calculate a controlled value of an aperture and a shutter speed here.

An aperture and a shutter speed are calculated based upon the photographic mode of a camera, a photometric value and a set value according to a given algorithm. If they are already calculated, use them.

[Step 754] Lift the main mirror (2) and the submirror (3) of a camera, communicate to the aperture drive circuit 111 and control the aperture 31 provided among lenses to the value calculated in the above step 753.

[Step 755] Electrify the magnet MG-1 via the shutter control circuit 108 and start exposure running the forward shutter curtain. Then, electrify the magnet MG-2 after the time calculated in the above step 753 elapses and terminate exposure running the rearward shutter curtain.

[Step 756] Lower the mirrors to predetermined positions, communicate to the aperture drive circuit 111 and release the aperture.

[Step 757] Feed a frame of film and charge the shutter spring.

[Step 758] Clear "a line-of-sight detection inhibit flag" and "an AF inhibit flag" here to detect a line of sight and a focus when "detection of a line of sight" subroutine is called.

[Step 759] Set "an after-release flag" showing release is performed.

[Step 760] Terminate "release & feeding" interrupt subroutine.

After "release & feeding" subroutine is finished, return to the step 603 in FIG. 6 without returning to a program in which an interrupt occurs.

In this second embodiment, even if a focus detection operation mode is "a mode for dynamic target object" or "a mode for a static target object" if "a continuous-shot mode" is selected, a line of sight is detected to determine focus detection areas every time a frame is photographed, and a focus is detected and focusing is performed in focus detection areas selected based upon detected lines of sight. If the result is an inappropriate value and the focus could not be detected, only a focus detection operation and a focusing operation are repeated again in the selected focus detection areas. A camera provided with a line-of-sight detecting function detects focus and performs focusing in the focus detection areas to which a line of sight is input without causing a deterioration in the continuing focusing operation and the continuous-shot speed.

Third Embodiment

Next, another embodiment of the invention will be described.

Figure 11B:
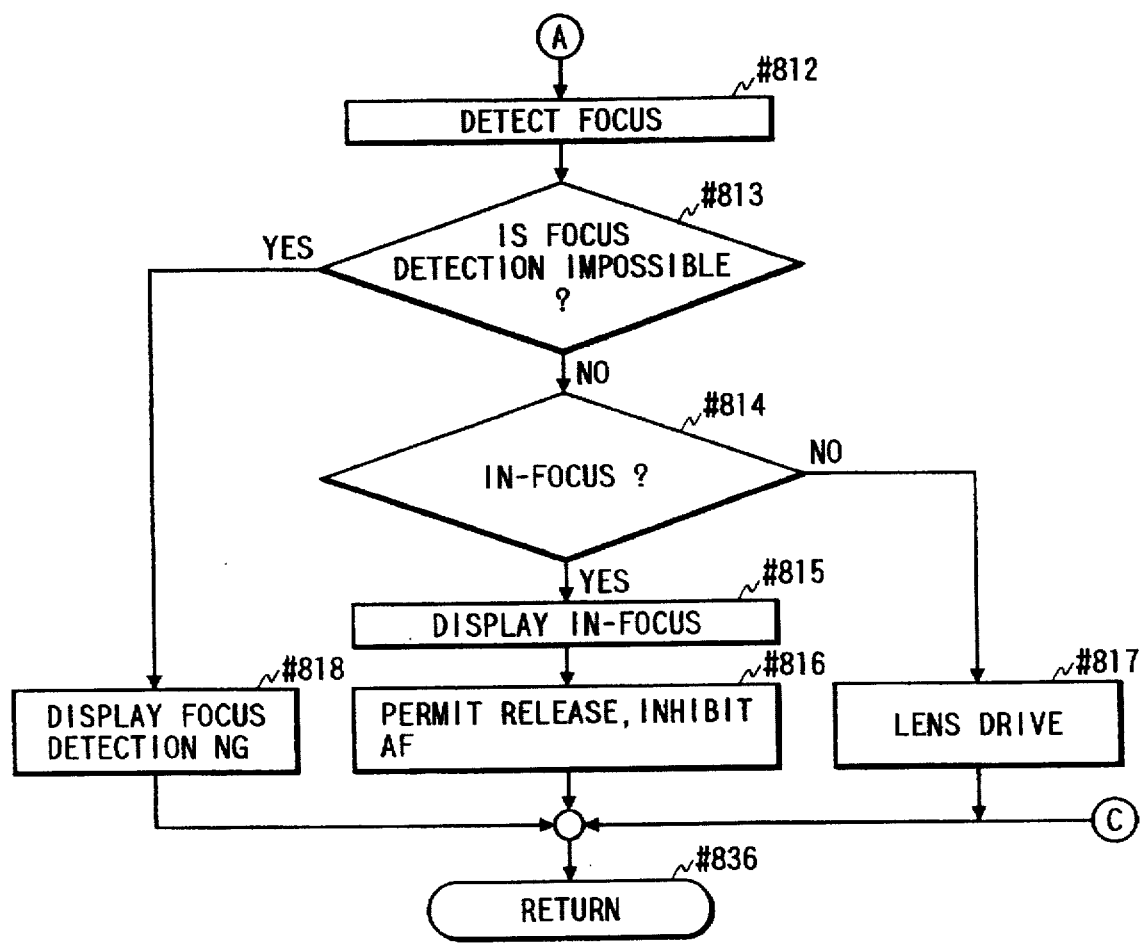
FIG. 11 is comprised of FIGS. 11A to 11D showing flowcharts illustrating the operation of "line-of-sight detection & AF" according to a third embodiment in case the invention is applied to a single-lens reflex camera.
Figure 11C:
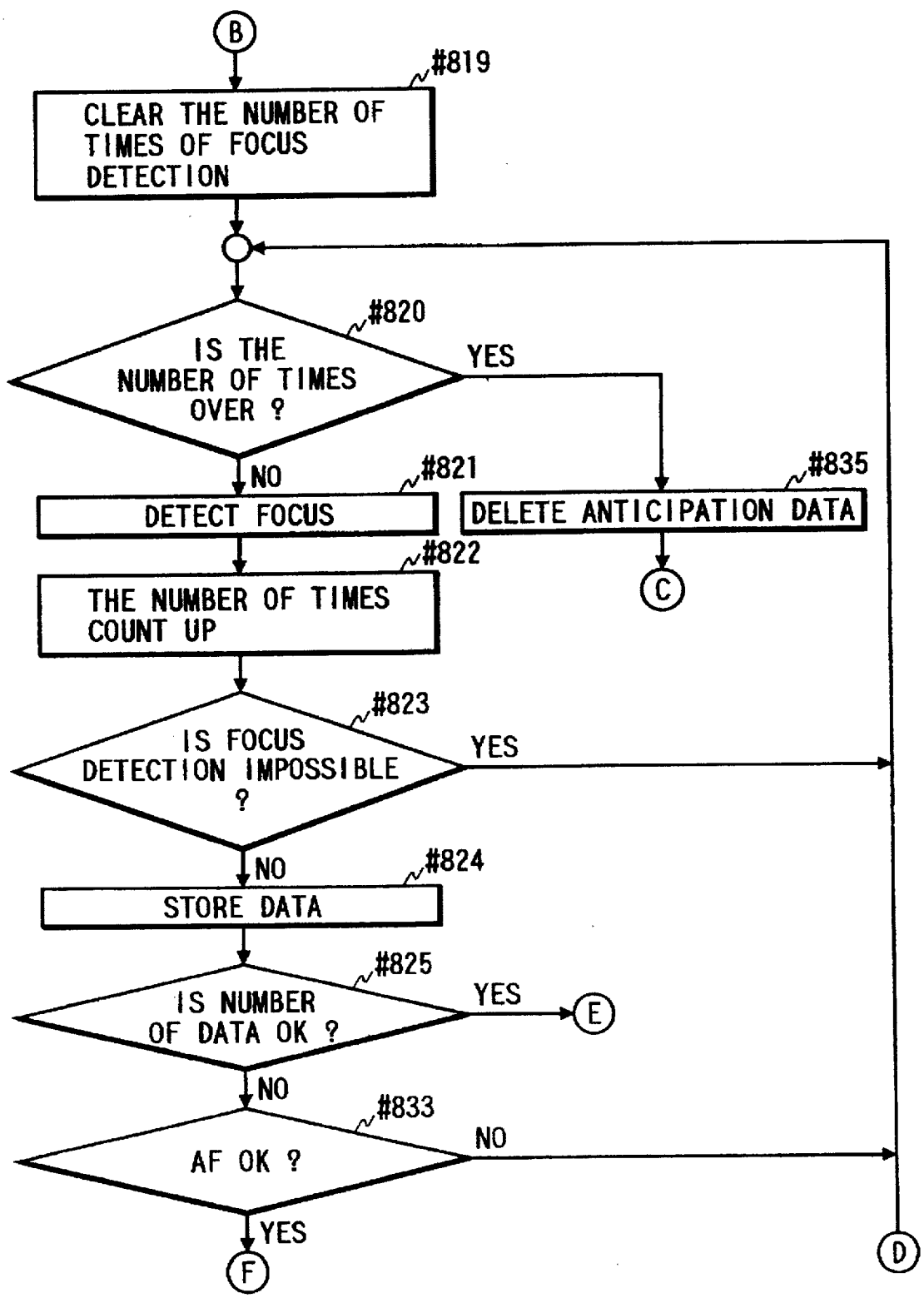
Figure 11D:
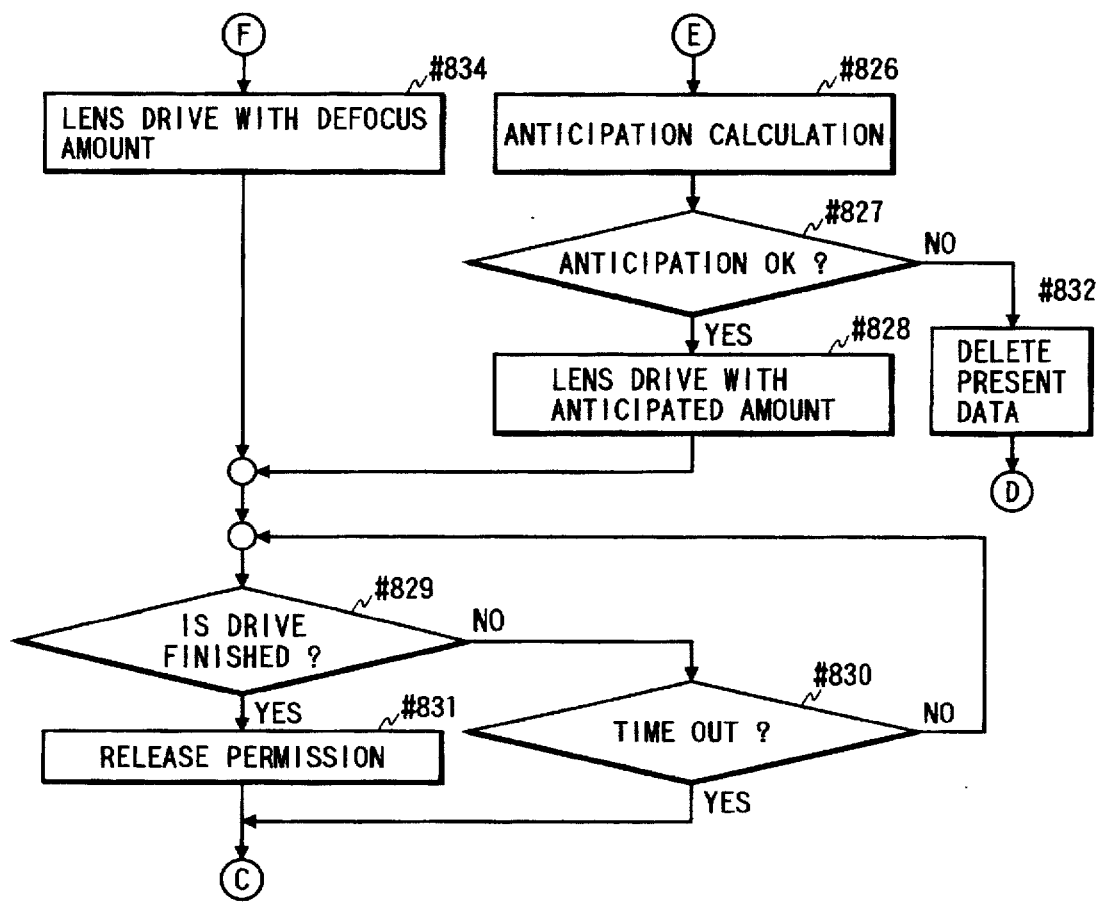
Figure 12:
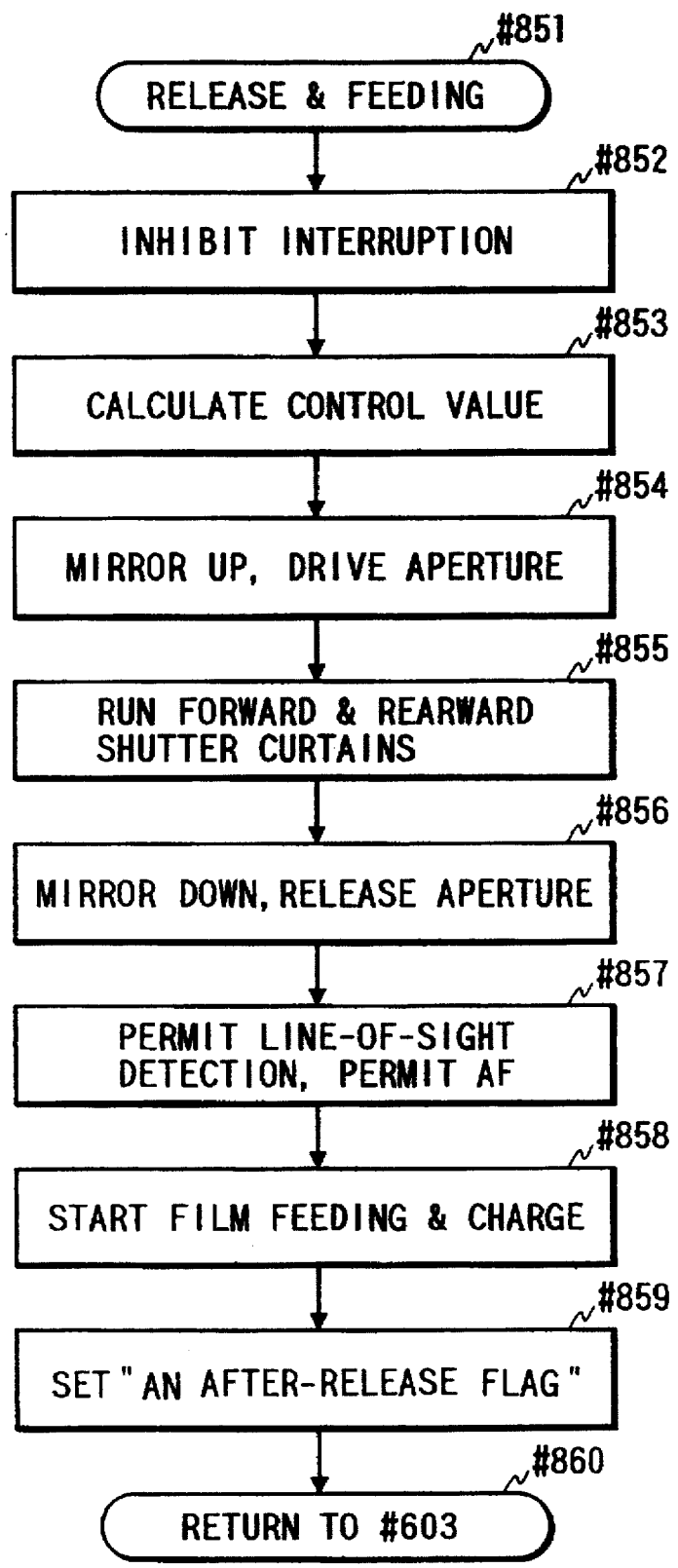
FIG. 12 is a flowchart showing the operation of "release and a start of feeding" according to a third embodiment in case the invention is applied to a single-lens reflex camera.

FIGS. 11A through 12 are flowcharts for explaining the operation of a third embodiment of the invention.

Figure 7:
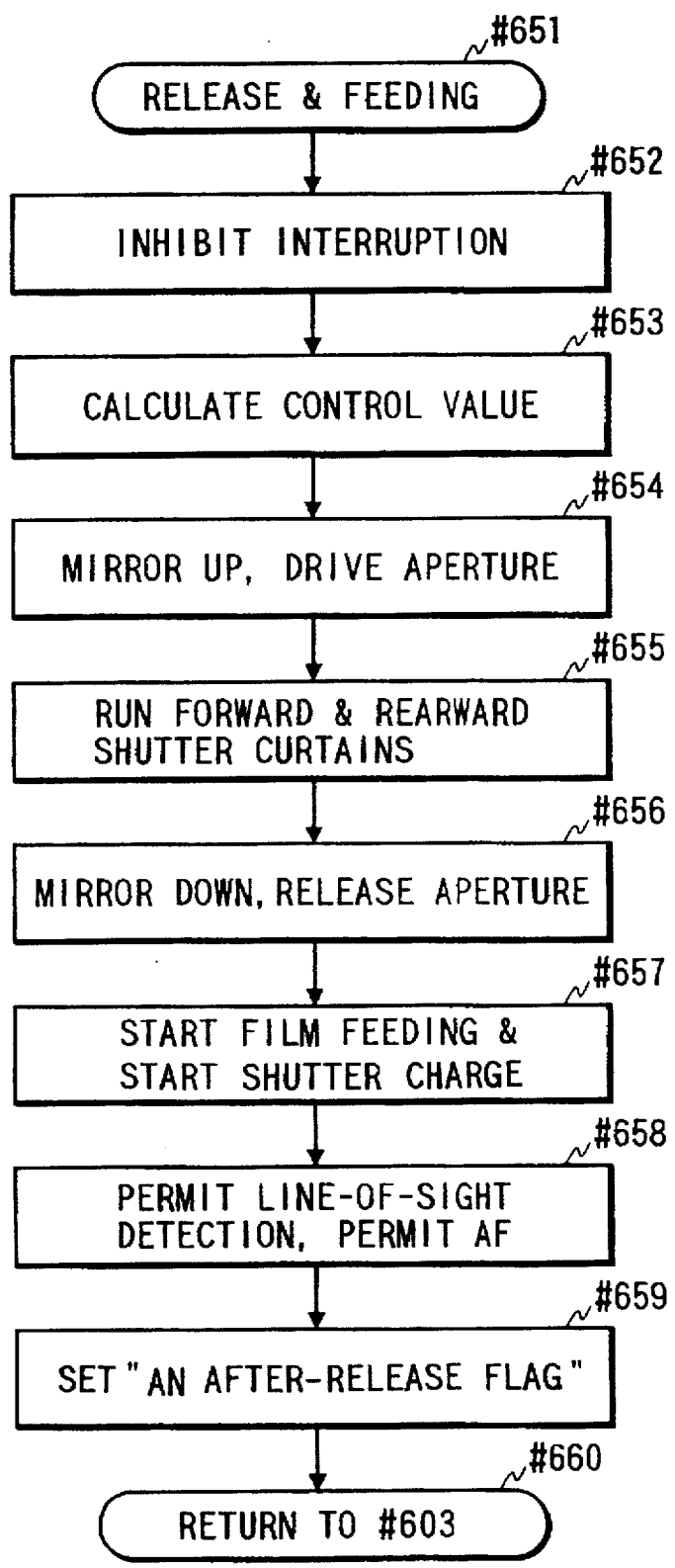
FIG. 7 is a flowchart showing the operation of "release & feeding" executed by interrupt processing.

FIGS. 11A to 11D are flowcharts equivalent to FIG. 8 according to the first embodiment and FIG. 12 is a flowchart equivalent to FIG. 7 according to the first embodiment. A description of the elements and operations which are similar to those in the first embodiment, will be omitted.

FIGS. 11A to 11D are flowcharts of the "line-of-sight detection & AF" subroutine executed in the step 612 in FIG. 6. First, this will be described.

When this "line-of-sight detection & AF" is called, the subroutine is executed from a step 802.

[Step 802] Determine whether release is performed in the one-shot mode or not. If not, that is, if release is performed in the continuous-shot feeding mode, proceed to step 803 and if so, that is, if release is performed in the one-shot mode, branch to a step 836 and return to this subroutine. The one-shot mode is controlled by this determination so that only a frame at a time can be photographed.

[Step 803] Determine whether line-of-sight detection is permitted or not here. It can be determined by checking whether "a line-of-sight detection inhibit flag" is set or not whether line-of-sight detection is inhibited or not. As line-of-sight detection is permitted at first, proceed to a step 804. If line-of-sight detection is inhibited, branch to a step 808 without performing a line-of-sight detection operation.

[Step 804] Before line-of-sight detection, display a mark showing the line of sight is input.

Illuminate the irradiating LED (F-LED) 25 to light a mark 78 showing a line of sight is input in the LCD 24 in the finder via the LCD drive circuit 105. Owing to this mark, a photographer can confirm that a camera detects the line of sight in 207 outside the finder screen.

[Step 805] Detect a line of sight according to given algorithm.

First illuminate predetermined IREDs (two or four of IRED1 to IRED6) corresponding to the position of a camera by IRED drive circuit 107 and start the charging operation of CCD-EYE 14 by the line-of-sight detection circuit 101. When charging is finished, CPU 100 reads an amount of stored charge in turn, converts if from analog to digital form and performs processing according to a given algorithm. Perform processing for overall pixels of CCD-EYE 14 and obtain the coordinates of reflected images on the cornea shown by 52a and 52b in FIG. 5A of beams from the light source for irradiating an eyeball and the central coordinates of the pupil 51. The coordinates of the point gazed at by a photographer are obtained by operating these according to the above-described algorithm.

[Step 806] Once a line of sight is detected, inhibit line-of-sight detection to prevent it from being repeated. Line-of-sight detection is inhibited by setting "a line-of-sight detection inhibit flag". Even if a subroutine, "line-of-sight detection & AF" is called again after control is returned to the step 613 in FIG. 6, then, passed to the step 603 and the step 611 in FIG. 6 after the subroutine, "line-of-sight detection & AF" is returned because line-of-sight detection is inhibited here, a line of sight is not detected.

[Step 807] Blink or light focus detection areas using the LED 21 for superimposition driven by sending a signal to the LED drive circuit 106 to inform a photographer of focus detection areas selected based upon detected lines of sight.

[Step 808] Determine whether lenses are driven or not by communicating with the focusing circuit 110 here. If driving of the lenses is not finished in case the "line-of-sight detection & AF" subroutine is executed last time and lenses are driven, branch to a step 836 here and return to this subroutine. Before lenses are driven or after driving lenses is finished, proceed to a step 809.

[Step 809] Determine whether the AF mode is "a mode for a static target object" or "a mode for a dynamic target object" here. If it is "a mode for a static target object", proceed to a step 810 and if it is "a mode for a dynamic target object", branch to a step 819.

Suppose the AF mode is "a mode for a static target object" and control is passed to a step 810 here.

[Step 810] Determine whether focus detection is permitted or not by checking whether "an AF inhibit flag" is set or not. As "an AF inhibit flag" is set if SW1 remains held once a detected focus is in focus, branch to a step 836 and return to this subroutine. If "an AF inhibit flag" is not set, proceed to a step 812. As in "a mode for a dynamic target object" "an AF inhibit flag" is not set, perform this determination after in a step 809 an AF mode is determined. That is, only in "a mode for a static target object" this determination is performed.

[Step 812] Detect a focus. In detail, detect a focus in focus detection areas selected based upon detected lines of sight of plural focus detection areas.

[Step 813] Determine whether the focus could not be detected in focus detection areas in the step 812 or not. If the focus could not be detected, branch to a step 818 and if it could be detected, proceed to a step 814.

[Step 814] Determine whether a detected focus is in focus or not. If defocus amount obtained in detecting the focus is within a given amount, determine a detected focus is in focus. If focused, proceed to a step 815 and if not, branch to a step 817.

[Step 815] Display a mark showing a detected focus is in focus to inform a photographer of it.

Illuminate the irradiating LED (F-LED) 25 to light a mark 79 showing a detected focus is in focus in the LCD 24 in the finder via the LCD drive circuit 105.

[Step 816] As a detected focus is in focus, enable "release & feeding" interruption to allow the performing of a release operation by an interrupt when SW2 is pressed. Further, set "an AF inhibit flag" to inhibit focus detection.

If a detected focus is not in focus in the above step 814, proceed to a step 817.

[Step 817] Drive lenses here.

Obtain the amount the lenses are to be driven from a defocus amount when a focus is detected in the above step 812 and communicate it to the focusing circuit 110. The focusing circuit 110 drives the motor 33 for driving lenses, monitoring the pulse plate 36 and drives lenses equivalent to the communicated amount of lenses to be driven. CPU 100 is not required to monitor the amount the lenses are to be driven after it communicates the data to the focusing circuit 110 and can perform another operation, other than driving lenses. Therefore, when communication with the focus detection circuit is finished, proceed to a step 836 and return to the subroutine.

If focus detection is determined to be impossible in the above step 813, proceed to a step 818 as described above.

[Step 818] Display AF is disabled to inform a photographer that a focus could not be detected. Concretely, blink a mark 79 showing a detected focus is in focus in the LCD 24 in the finder.

If the AF mode is determined to be "a mode for a dynamic target object" in the above step 809, proceed to a step 819 as described above.

[Step 819] Clear a counter for counting a frequency of focus detection. If in "a mode for a dynamic target object" the result of focus detection is inappropriate to anticipated operation and servo operation, repeat only detection of the focus in focus detection areas determined without line-of-sight detection. However, the repeat frequency is limited. Therefore, a counter for counting the frequency is required to be cleared.

[Step 820] Determine the frequency of focus detection and if the frequency does not exceed a predetermined value, proceed to a step 821. If it exceeds the value, proceed to a step 835. The threshold value of the frequency of focus detection is set to 2 to 3 times.

[Step 821] Detect a focus. In detail, detect a focus in focus detection areas selected based upon detected lines of sight of plural focus detection areas.

[Step 822] Increment the frequency of focus detection.

[Step 823] Determine whether the focus could not be detected in the above step 821 or not. If the focus could not be detected, branch to a step 820 and if the frequency of focus detection is determined and it does not exceed a predetermined value, detect the focus again in a step 821. If a focus could be detected, proceed to a step 824.

[Step 824] Store or update defocus data and the timing at which the focus is detected to anticipate movement of a target object.

[Step 825] Operate movement of a target object based upon focus detection data plural times in the past according to a given algorithm. Determine whether the past data is sufficient or not here. If the data is sufficient and movement of a target object can be anticipated, proceed to a step 826 and if the data is not sufficient, branch to a step 833.

[Step 826] A calculation for correcting a movement of the target object caused by a release time lag to defocus the amount detected by the focus detection means this time, is performed. Namely, the movement of the target object (speed, direction) is anticipated based on the past focus detection result stored in EEPROM 100a. An anticipated defocus amount is calculated for the detected defocus amount. The anticipated defocus in the corresponds to a change amount of focus position of the target object caused during the release time lag when a shutter curtain is run since a release switch SW2 is turned on.

[Step 827] It is determined whether the calculated anticipated defocus amount is appropriate or not. Concretely, if the anticipated defocus amount is larger than a constant threshold value or if the movement of direction of the target value is inverted, determine the result of anticipation to be inappropriate and branch to a step 832. That is, when a focus detection area changes to a background in an instance in which the focus is detected or when the focus is detected on an obstacle on this side if a moving target object is detected as a focus, the anticipated defocus amount immediately increases. At such the time a focus can be detected. However, as it is possible that a target object is not caught right, determine the result of the anticipation to be inappropriate.

In the meantime, if the result of anticipation is appropriate, proceed to a step 828.

[Step 828] Convert a corrected defocus amount to a lens drive amount and drive lenses (perform AF operation) by communicating the value to the focusing adjusting circuit 110.

[Step 829] Determine whether the driving of the lenses is finished or not. CPU 100 can detect the status of lenses by communicating to the focusing circuit 110. If driving lenses (AF operation) is finished, proceed to a step 831. If lenses are being driven, branch to a step 830.

[Step 830] Determine the drive time because the time for driving of the lenses is limited. If a given time elapses, proceed to a step 836 and return to the subroutine. If the given time does not elapse, return to a step 829 and determine whether the driving of the lenses (AF operation) is finished or not.

That is, wait for the driving of the lenses (AF operation) to be finished within a predetermined time at the steps 829 and 830.

If the driving of the lenses (AF operation) is finished at the step 829 as described above, proceed to a step 831.

[Step 831] Permit release. When release is permitted while the switch SW2 is pressed, an interrupt subroutine, "release & feeding" is called immediately and photographic operation is performed.

If the result of anticipation was not appropriate at the above step 827, proceed to a step 832 as described above.

[Step 832] Delete data obtained this time in detecting the focus and perform the preparation for detecting the focus again.

If the result of anticipation is inappropriate, determine that a defocus amount this time is not right and detect the focus again.

Next, return to the step 820 and if the frequency of focus detection is not within a limit, repeat focus detection at the step 821.

If data is not sufficient to anticipate at the step 825 as described above, proceed to a step 833.

[Step 833] If the data is too little to anticipate, determine whether lenses should be driven (AF operation should be performed) based upon the newest detected defocus amount or not. If lenses should not be driven (AF operation should not be performed), return to the step 820 and if a frequency of focus detection is within a limit, detect a focus at the step 821.

If for example, a defocused amount is very large, return to the step 820 because it is determined that lenses should not be driven (AF operation should not be performed). This criterion is approximately similar to that of an anticipated defocus amount.

If lenses should be driven (Af operation should be performed), proceed to a step 834.

[Step 834] Drive lenses based upon the detected defocus amount. If the amount the lenses are to be driven is smaller than a predetermined value, the lenses are not driven to prevent the lenses from being hunched. Proceed to the above-described step 829, permit release at the step 831 after waiting for driving of the lenses to be finished and proceed to a step 836.

If the frequency of focus detection exceeds a limit at the above-described step 820, proceed to a step 835.

[Step 835] If the desirable result cannot be obtained even if a focus is detected predetermined times, delete data of anticipation here. Delete data of anticipation stored in the past to start anticipation from next time.

[Step 836] Terminate the subroutine, "line-of-sight detection & AF" and return.

Next, a release operation according to this embodiment will be described referring to a flowchart in FIG. 12. The release operation is executed by an interrupt routine.

[Step 851] When a release button is pressed by a second stroke and SW2 is turned on while interruption is enabled, the "release & feeding" subroutine is called by interrupt processing.

[Step 852] Disable an interrupt of "release & feeding".

[Step 853] Calculate a controlled value of an aperture and a shutter speed here.

An aperture and shutter speed are calculated based upon the photographic mode of the camera, a photometric value or a set value according to a given algorithm. If they are already calculated, use the value.

[Step 854] Lift the main mirror (2) and the submirror (3) of a camera, communicate with the aperture drive circuit 111 and control an aperture 31 provided among lenses to the value calculated at the step 853.

[Step 855] Electrify the magnet MG-1 via the shutter control circuit 108 and start exposure running the forward shutter curtain. Then, electrify the magnet MG-2 after the time calculated at the above step 853 elapses and terminate exposure running the rearward shutter curtain.

[Step 856] Lower mirrors to predetermined positions and communicate with the aperture drive circuit 111 to release the aperture.

[Step 857] Clear "a line-of-sight detection inhibit flag" and "an AF inhibit flag" to detect the line of sight and the focus when the "line-of-sight detection" subroutine is called.

[Step 858] Charge the shutter spring and then start feeding of a film. Clear a counter for counting perforations of a film, electrify the motor for winding the film and enable a feeding interruption.

Referring to the actual feeding control, an interruption request occurs in hardware every time feeding for a perforation is finished and every time an interruption request occurs, the number of perforations is incremented in an interrupt processing subroutine. Further, feeding is controlled so that a motor may be stopped every 8 perforations. When feeding is finished, a flag showing feeding is finished is on in the interrupt subroutine.

As feeding control is processed by the interrupt subroutine, proceed to a step 859 immediately when feeding is started. Even after the "release & feeding" subroutine is returned to a film is fed and simultaneously another operation can be performed.

[Step 859] Set "an after-release flag" showing that release was performed.

[Step 860] Terminate the interrupt subroutine, "release & feeding".

However, return to the "release & start of feeding" subroutine to the step 603 in FIG. 6 without returning to the program in which the interrupt occurs.

A line-of-sight and focus detecting operation in a continuous-shot mode will be described. As the switch SW2 remains pressed in a continuous-shot mode, line-of-sight detection is performed to prepare for when line-of-sight detection may be permitted after release and detection of a focus is performed. When "release is permitted" after the lenses are driven, the next release operation (photography for a frame) is performed immediately. However, if release is not permitted such as if the focus could not be detected and if the result of focus detection is not consistent with an anticipated value only focus detection is repeated without performing the line-of-sight detecting operation.

What is claimed is:

1. A camera for detecting the line-of-sight of a user, comprising a photographing control circuit for performing a continuous shot operation in which a photographing operation is repeated continuously while a release button is pressed;

a line-of-sight detection device for detecting a position of the user's line of sight;

a line-of-sight detection control circuit for operating said line-of-sight detection device for every photographing operation of said continuous shot operation;

a focus detection device for performing a focus detecting operation based upon the position of the line of sight detected by said line-of-sight detection device;

a determination circuit for determining whether the result of focus detection by said focus detection device is appropriate; and a focus detection control circuit for operating said focus detection circuit without operating said line-of-sight detection device if said determination circuit determines that the result of focus detection is inappropriate.

2. A camera according to claim 1, wherein
   said determination circuit determines the result of focus detection is inappropriate if the focus cannot be detected.

3. A camera according to claim 1, wherein said focus detection device has plural operation modes.

4. A camera according to claim 3, wherein said camera operates in an anticipation calculation mode in which change of a focus position caused due to a release time lag is anticipated based upon the past results of focus detection in order to correct the present result of focus detection.

5. A camera according to claim 3, wherein an operation mode of said focus detection device is set by the user.

6. A camera according to claim 4, wherein said focus detection device has a memory for storing the past results of focus detection, and said focus detection device outputs the present result of focus detection without correcting it if the number of the past results of focus detection stored in said memory is insufficient when said focus detection device is operated in said anticipation calculation mode.

7. A camera according to claim 4, wherein said determination circuit determines the result of focus detection is inappropriate if a defocused amount corresponding to an anticipated change of a focus position caused due to the release time lag exceeds a predetermined range.

8. A camera according to claim 4, wherein said determination circuit determines that the result of focus detection is inappropriate if the direction of anticipated change of a focus position caused due to the release time lag is different from the direction of movement of a target object obtained from the past results of focus detection.

9. A camera according to claim 6, wherein said memory deletes the past results of focus detection stored in it if said determination circuit determines that an inappropriate result of focus detection is repeated more frequently than a predetermined number of times when said focus detection device is operated in said anticipation calculation mode, and said focus detection device stops the operation in said anticipation calculation mode.

10. A camera for detecting the line-of-sight of a user, comprising an exposure control circuit for performing an exposure operation according to an operation of a release button;

a line-of-sight detection device for detecting a position of the user's line of sight;

a line-of-sight detection inhibition circuit for inhibiting operation of said line-of-sight detection device immediately after a line-of-sight detecting operation; and a line-of-sight detection permission circuit for releasing the inhibition of line-of-sight detection after an exposure operation.

11. A camera according to claim 10, further comprising a focus detection device for performing a focus detecting operation based on the result of detection by said line-of-sight detection device.

12. A camera according to claim 11, wherein said focus detection device detects the focus respectively, in predetermined plural focus detection areas and selects at least one focus detection area of said plural focus detection areas based upon the result of detection by said line-of-sight detection device.

13. A camera according to claim 12, further comprising a determination circuit for determining whether the result of focus detection of the selected focus detection areas is appropriate; and a focus detection control circuit for operating said focus detection device again without operating said line-of-sight detection device if said determination circuit determines the result of focus detection is inappropriate.

14. A camera according to claim 13, wherein said determination circuit determines the result of focus detection is inappropriate if the focus cannot be detected.

15. A camera according to claim 13, wherein said focus detection device has plural operation modes.

16. A camera according to claim 15, wherein said camera operates in an anticipation calculation mode in which change of the focus position caused due to a release time lag is anticipated based upon the past results of focus detection in order to correct the present result of focus detection.

17. A camera according to claim 15, wherein an operation mode of said focus detection device is set by a user.

18. A camera according to claim 16, wherein said focus detection device has a memory for storing the past results of focus detection, and said focus detection device outputs the present result of focus detection without correcting it if the number of the past results of focus detection stored in said memory is insufficient when said focus detection device is operated in said anticipation calculation mode.

19. A camera according to claim 16, wherein said determination circuit determines that the result of focus detection is inappropriate if a defocused amount corresponding to an anticipated change of a focus position caused due to the release time lag exceeds a predetermined range.

20. A camera according to claim 16, wherein said determination circuit determines the result of focus detection is inappropriate if the direction of an anticipated change of a focus position caused due to the release time lag is different from the direction of movement of a target object obtained from the past results of focus detection.

21. A camera according to claim 18, wherein said memory deletes the past results of focus detection stored in it if said determination circuit determines that an inappropriate result of focus detection is repeated more frequently than a predetermined number of times when said focus detection device is operated in said anticipation calculation mode, and said focus detection device stops operation in said anticipation calculation mode.

* * * * *

UNITED STATES PATENT AND TRADEMARK OFFICE
CERTIFICATE OF CORRECTION

PATENT NO. : 5,737,642

DATED : April 7, 1998

INVENTOR(S): KEISUKE AOYAMA

It is certified that error appears in the above-identified patent and that said Letters Patent is hereby corrected as shown below:

ON THE COVER PAGE

At item [56], under "FOREIGN PATENT DOCUMENTS",
    "4061135  3/1986  Japan" should read
--61-61135  3/1986  Japan--.

IN THE DISCLOSURE

COLUMN 4 line 35, "CCDs" should read --CCDs,--.

COLUMN 6 line 20, "updown" should read --up-down--; and
    line 50, "reference number" should read
--reference number 51--.

UNITED STATES PATENT AND TRADEMARK OFFICE
CERTIFICATE OF CORRECTION

PATENT NO. : 5,737,642

DATED : April 7, 1998

INVENTOR(S): KEISUKE AOYAMA

It is certified that error appears in the above-identified patent and that said Letters Patent is hereby corrected as shown below:

COLUMN 11 line 17, "a" should be deleted; and
    line 32, "Judge" should read --Determine--.

COLUMN 12 line 5, "line-of sight" should read --line-of-sight--; and
    line 26, "judgment" should read --determination--.

COLUMN 18 line 24, "in the" should read --in the detected defocus amount--; and
    line 38, "such the time a" should read --such a time the--.

COLUMN 19 line 25, "(Af" should read --(AF--.

UNITED STATES PATENT AND TRADEMARK OFFICE
CERTIFICATE OF CORRECTION

PATENT NO. : 5,737,642

DATED : April 7, 1998

INVENTOR(S) : KEISUKE AOYAMA

It is certified that error appears in the above-identified patent and that said Letters Patent is hereby corrected as shown below:

COLUMN 20 line 43, "comprising" should read --comprising:--.

COLUMN 21 line 44, "comprising" should read --comprising:--.

COLUMN 22 line 4, "comprising" should read --comprising:--.

Signed and Sealed this

Third Day of November, 1998

*Attest:*

BRUCE LEHMAN

*Attesting Officer*    *Commissioner of Patents and Trademarks*